United States Patent
Miura et al.

(10) Patent No.: US 7,817,523 B2
(45) Date of Patent: Oct. 19, 2010

(54) RECORDING MEDIUM, RECORDING APPARATUS AND RECORDING METHOD, AND COMPUTER PROGRAM

(75) Inventors: Masahiro Miura, Saitama (JP); Masahiro Kato, Saitama (JP); Eisaku Kawano, Saitama (JP); Tohru Kanegae, Saitama (JP)

(73) Assignee: Pioneer Corporation, Tokyo (JP)

( * ) Notice: Subject to any disclaimer, the term of this patent is extended or adjusted under 35 U.S.C. 154(b) by 634 days.

(21) Appl. No.: 11/795,202

(22) PCT Filed: Jan. 12, 2006

(86) PCT No.: PCT/JP2006/300261
§ 371 (c)(1),
(2), (4) Date: Jul. 13, 2007

(87) PCT Pub. No.: WO2006/075645
PCT Pub. Date: Jul. 20, 2006

(65) Prior Publication Data
US 2008/0019239 A1 Jan. 24, 2008

(30) Foreign Application Priority Data
Jan. 14, 2005 (JP) .............................. 2005-008444

(51) Int. Cl.
*G11B 7/007* (2006.01)
(52) U.S. Cl. ................ 369/59.25; 369/275.3; 369/47.53
(58) Field of Classification Search ................ 369/47.5, 369/47.51, 47.53, 53.26, 94, 275.3, 59.25, 369/283
See application file for complete search history.

(56) References Cited

U.S. PATENT DOCUMENTS

| | | | |
|---|---|---|---|
| 7,345,973 B2 * | 3/2008 | Martens et al. | 369/47.53 |
| 2002/0064124 A1 | 5/2002 | Yamamoto et al. | |
| 2003/0185121 A1 * | 10/2003 | Narumi et al. | 369/47.53 |
| 2005/0013222 A1 * | 1/2005 | Lee et al. | 369/47.51 |
| 2005/0025013 A1 * | 2/2005 | Yamamoto | 369/47.53 |
| 2005/0226133 A1 * | 10/2005 | Ueki | 369/275.3 |
| 2006/0153055 A1 * | 7/2006 | Suh | 369/275.1 |

FOREIGN PATENT DOCUMENTS

| | | |
|---|---|---|
| JP | 10-11766 | 1/1998 |
| JP | 2000-311346 | 11/2000 |
| JP | 2001-23237 | 1/2001 |
| JP | 2002-92939 | 3/2002 |
| WO | 02/23542 A1 | 3/2002 |

* cited by examiner

*Primary Examiner*—Wayne R Young
*Assistant Examiner*—Thomas D Alunkal
(74) *Attorney, Agent, or Firm*—Young & Thompson

(57) ABSTRACT

A recording medium (100) is provided with: a first recording layer (L0) including a first area; and a second recording layer (L1) including a second area, wherein an edge on one side of the second area is located at a position obtained by shifting to an other side at least by a tolerance length from an area portion in the second recording layer corresponding to an edge on the one side of the first area, or an edge on the other side of the second area is located at a position obtained by shifting to the one side at least by the tolerance length from the area portion in said second recording layer corresponding to the edge on the one side of the first area, in which the tolerance length indicates an acceptable range of a relative position shift between an address which is defined on the predetermined position in the first recording layer and an address which is related to the predetermined position in the second recording layer.

10 Claims, 14 Drawing Sheets

[FIG. 1]
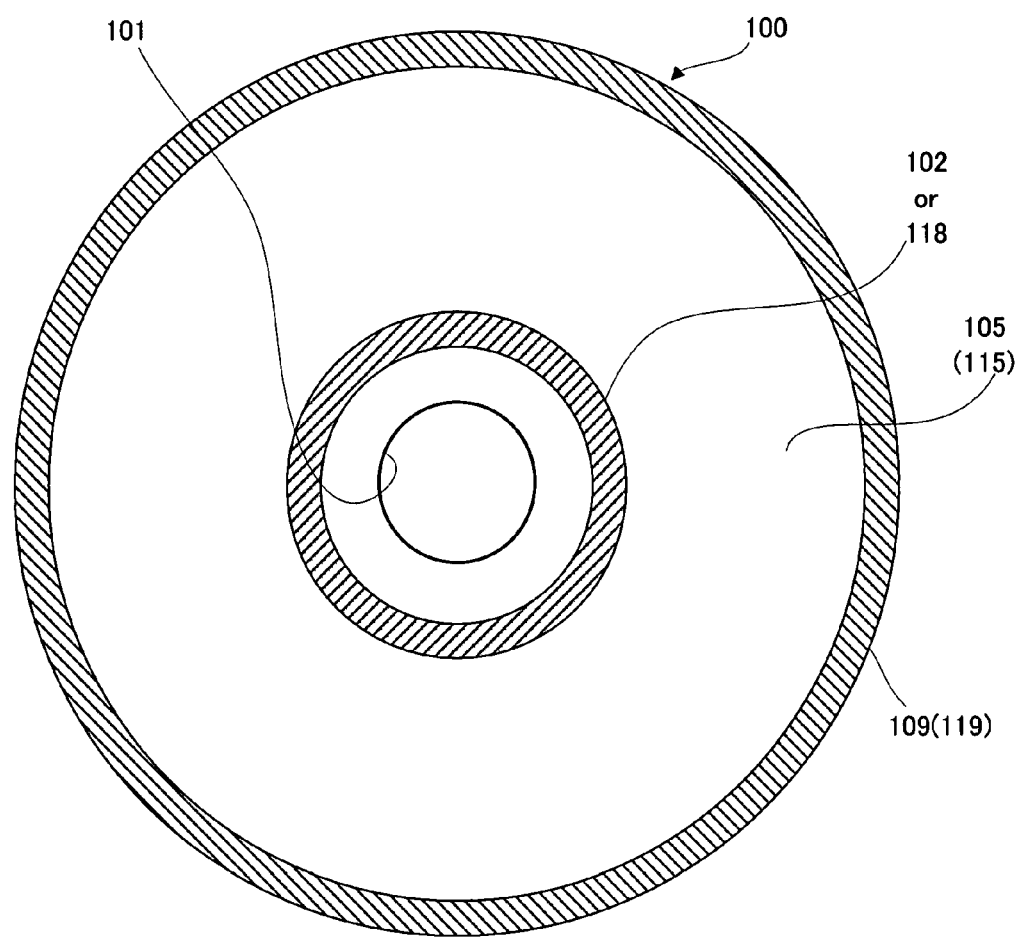

[FIG. 2]
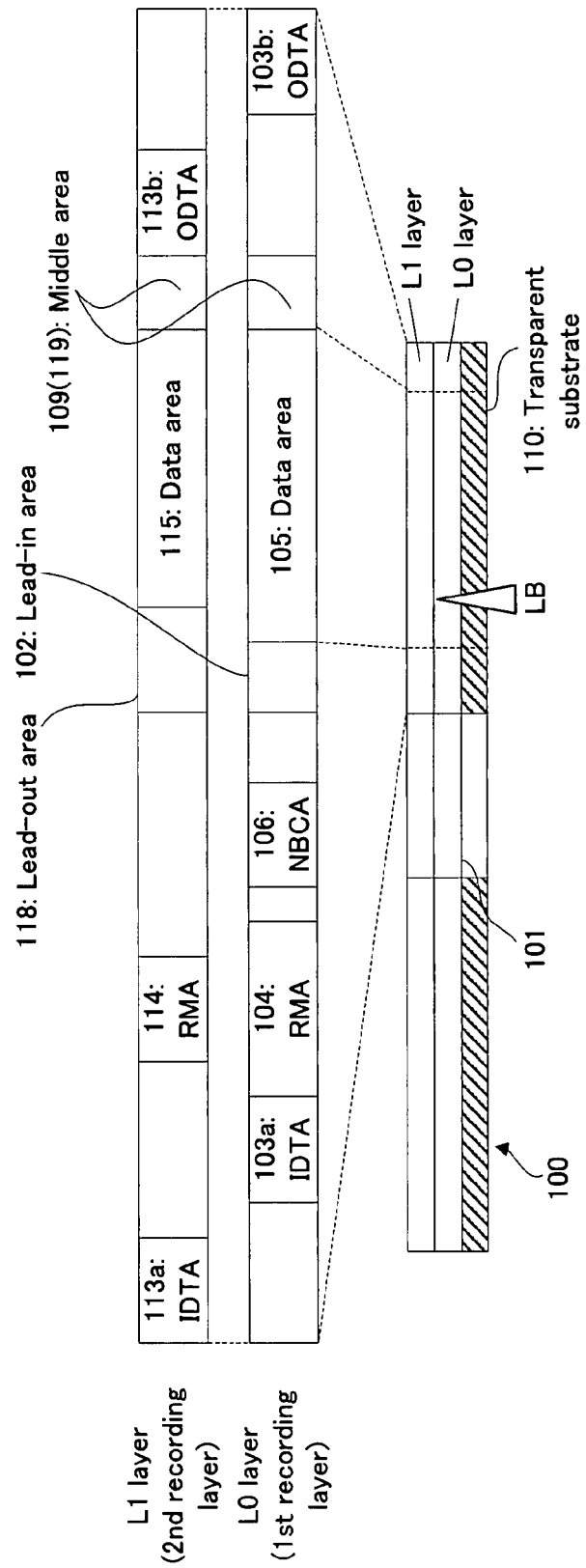

[FIG. 3]
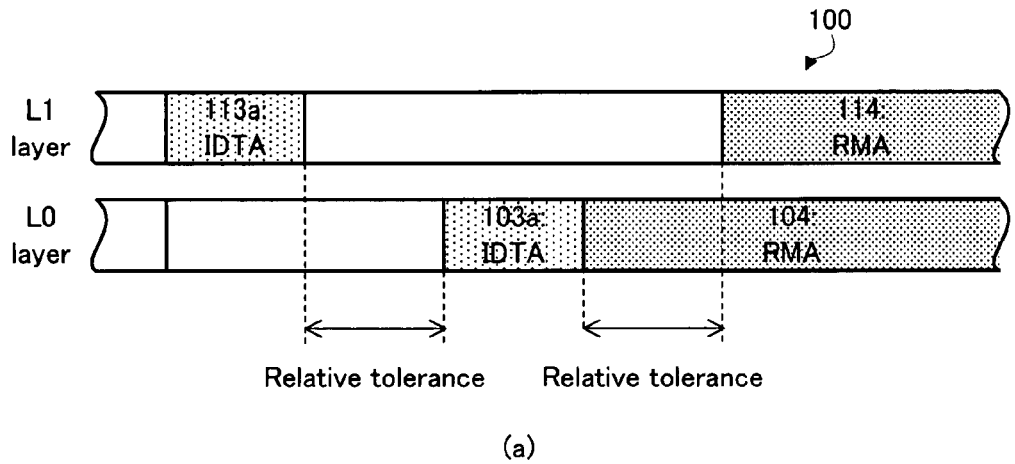
(a)
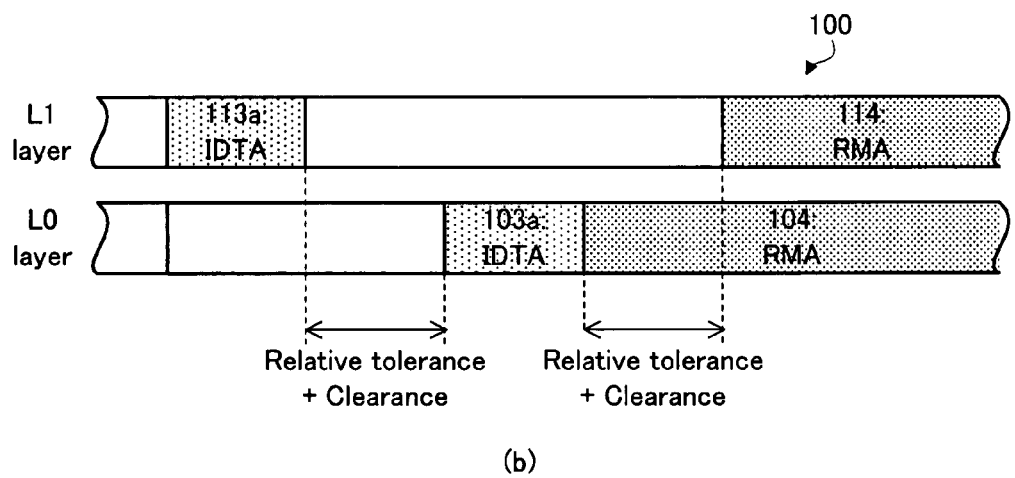
(b)
[FIG. 4]
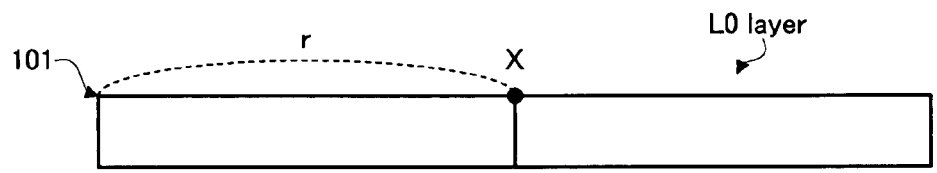
(a)
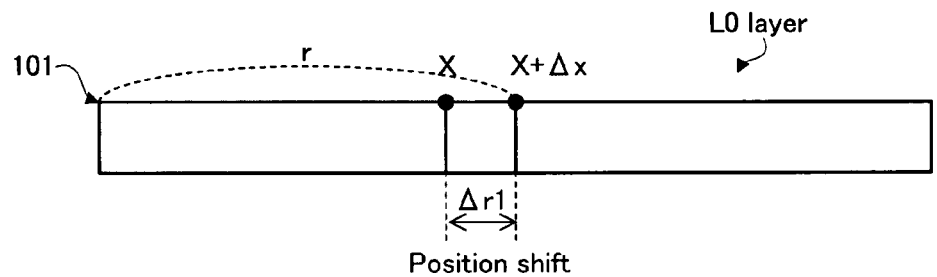
(b)

[FIG. 5]
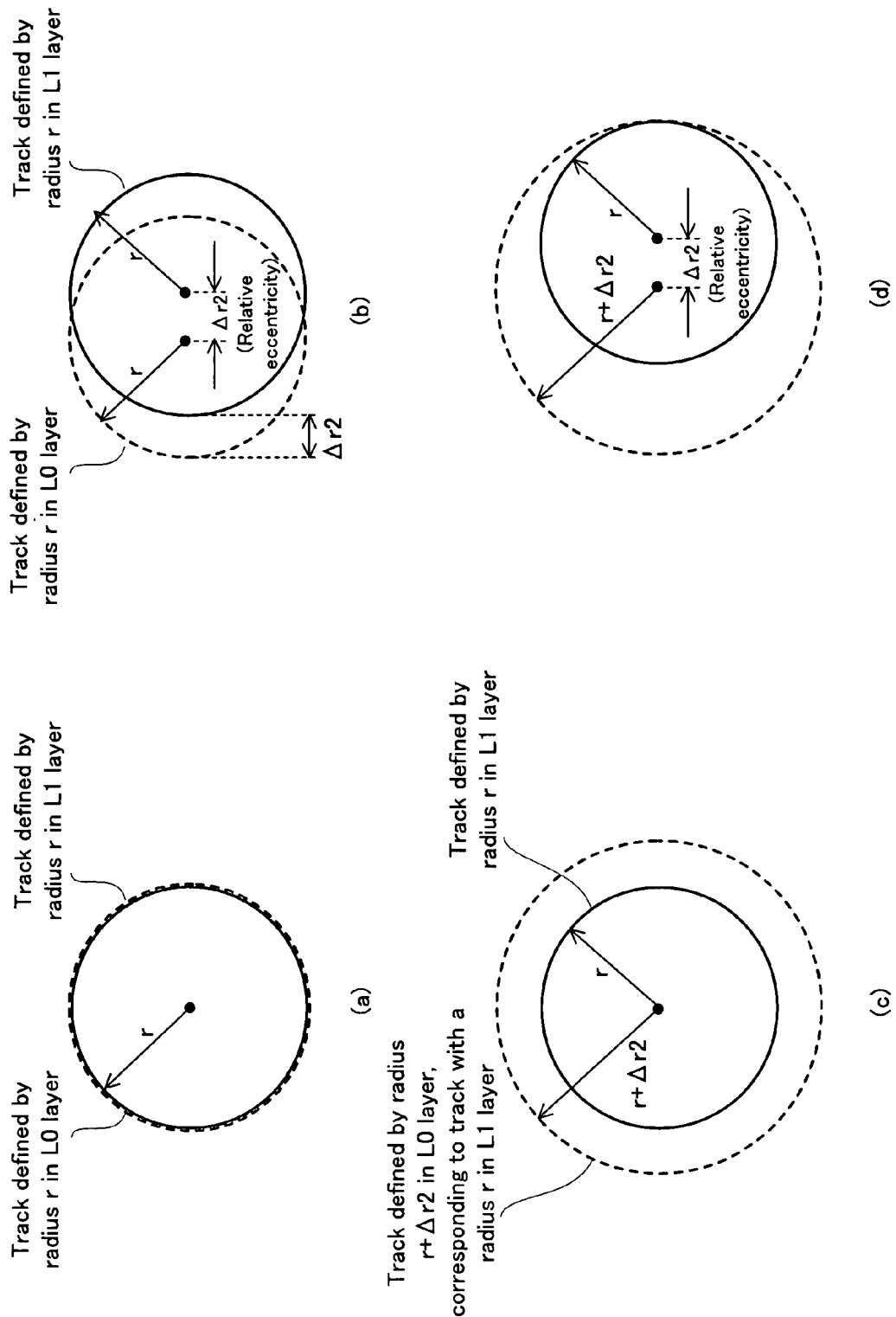

[FIG. 6]
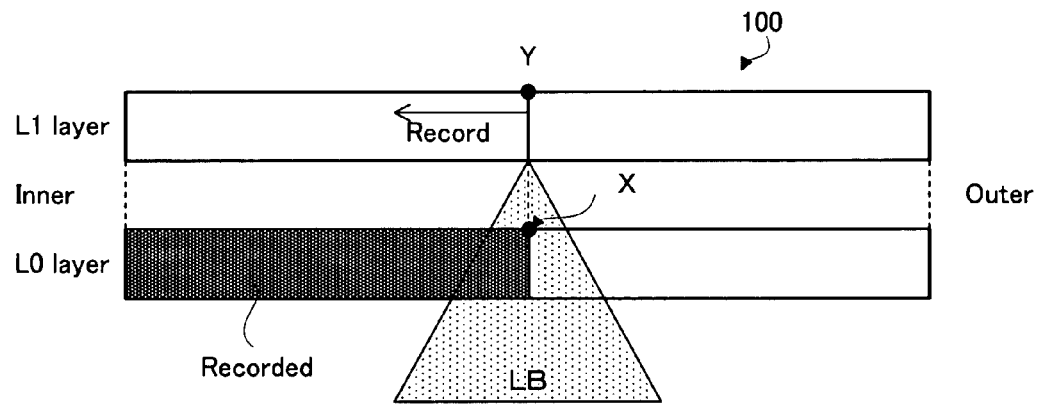
(a)
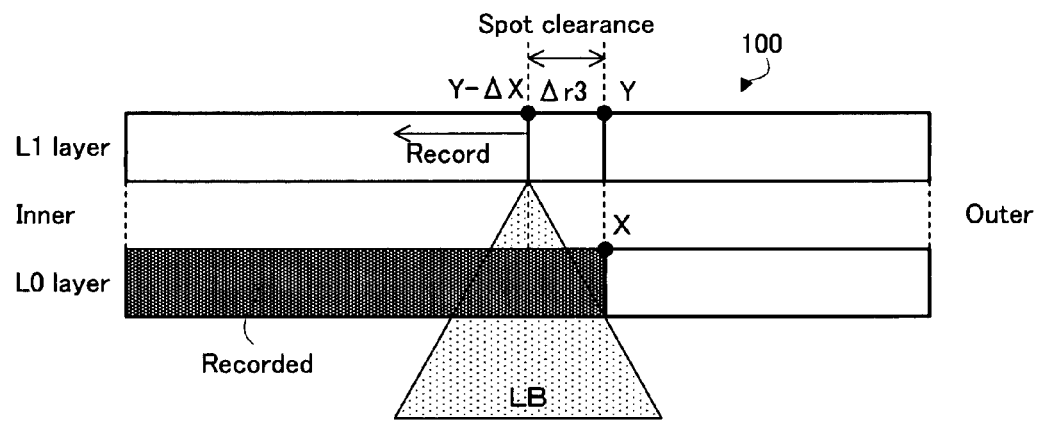
(b)

[FIG. 7]
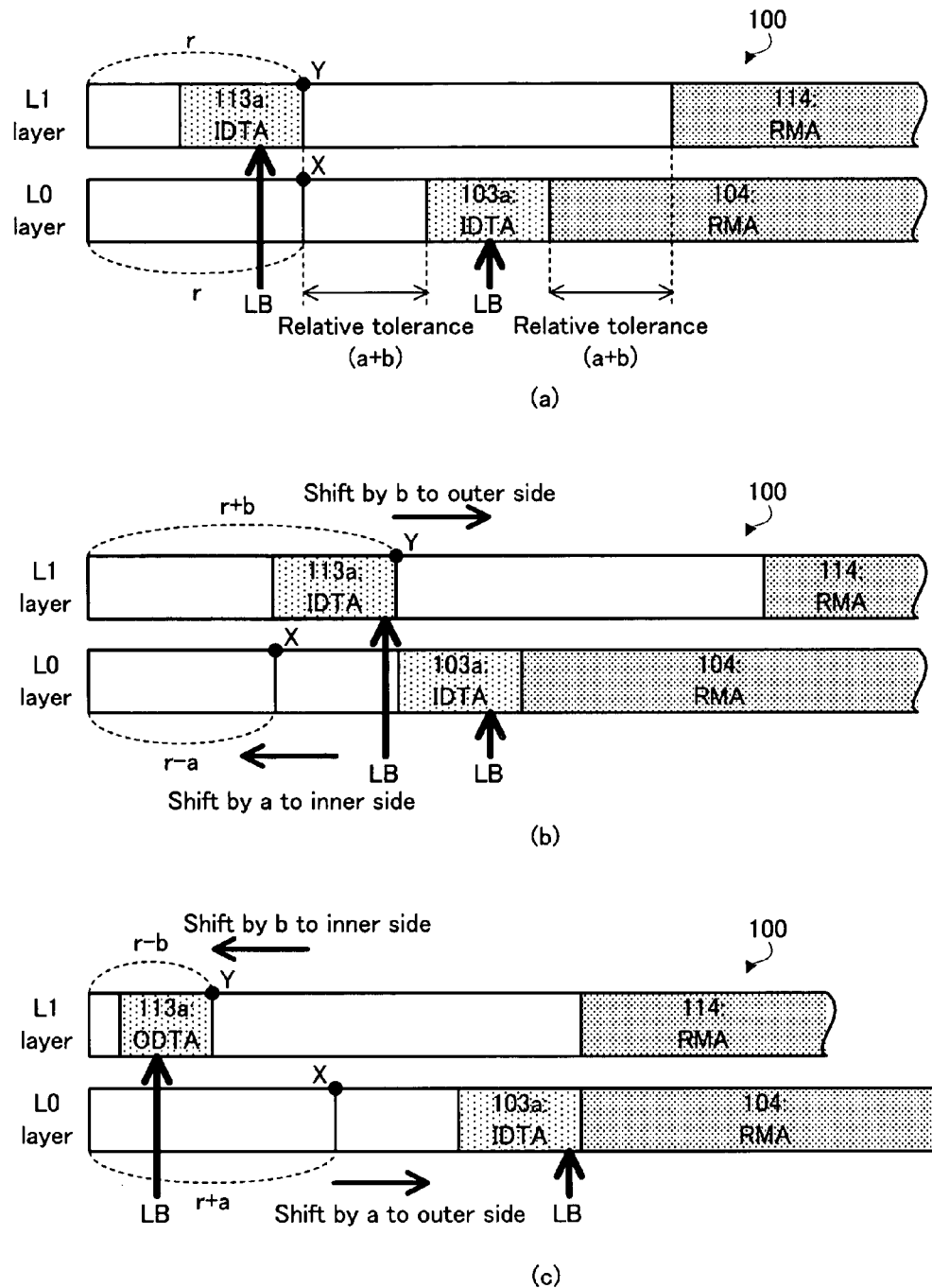

[FIG. 8]
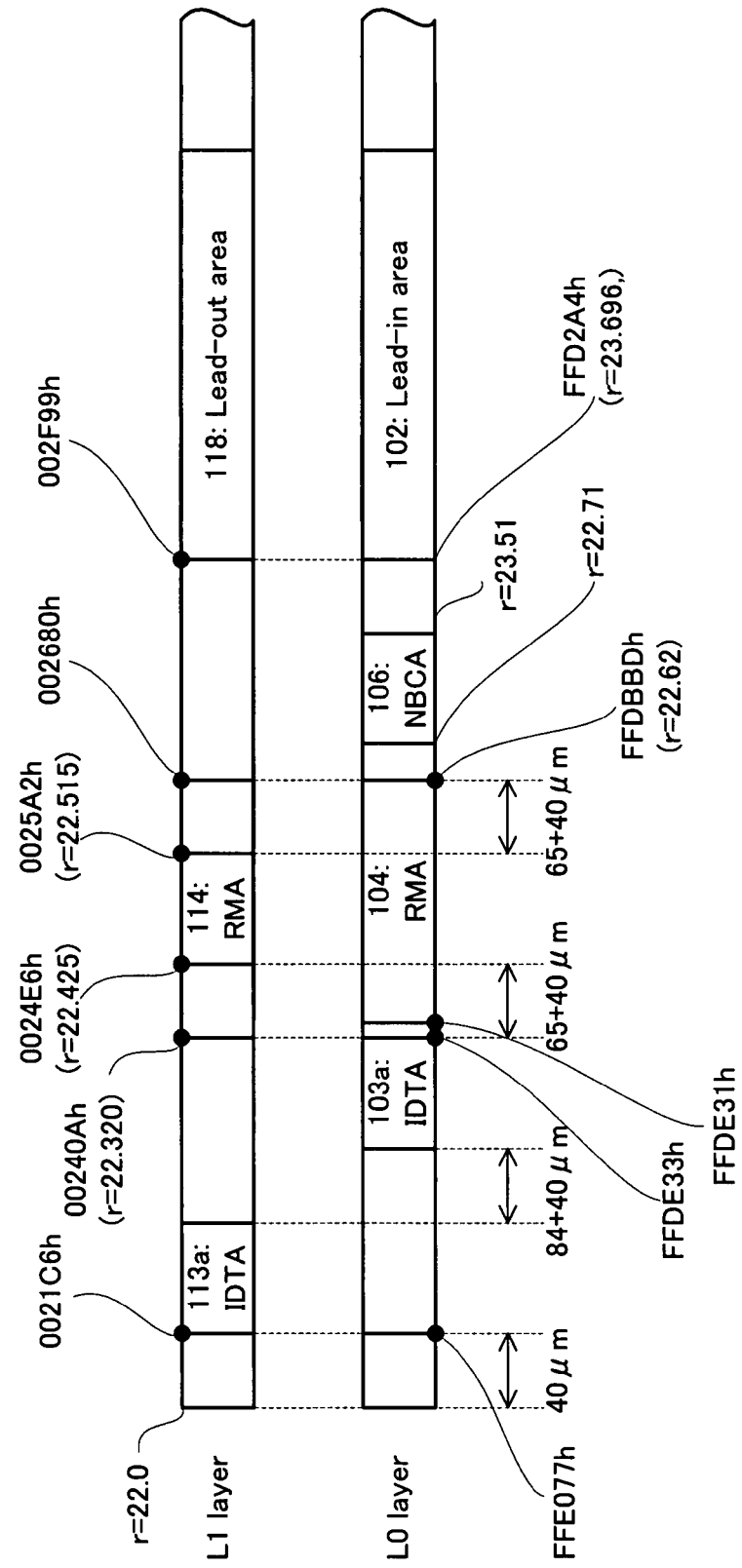

[FIG. 9]
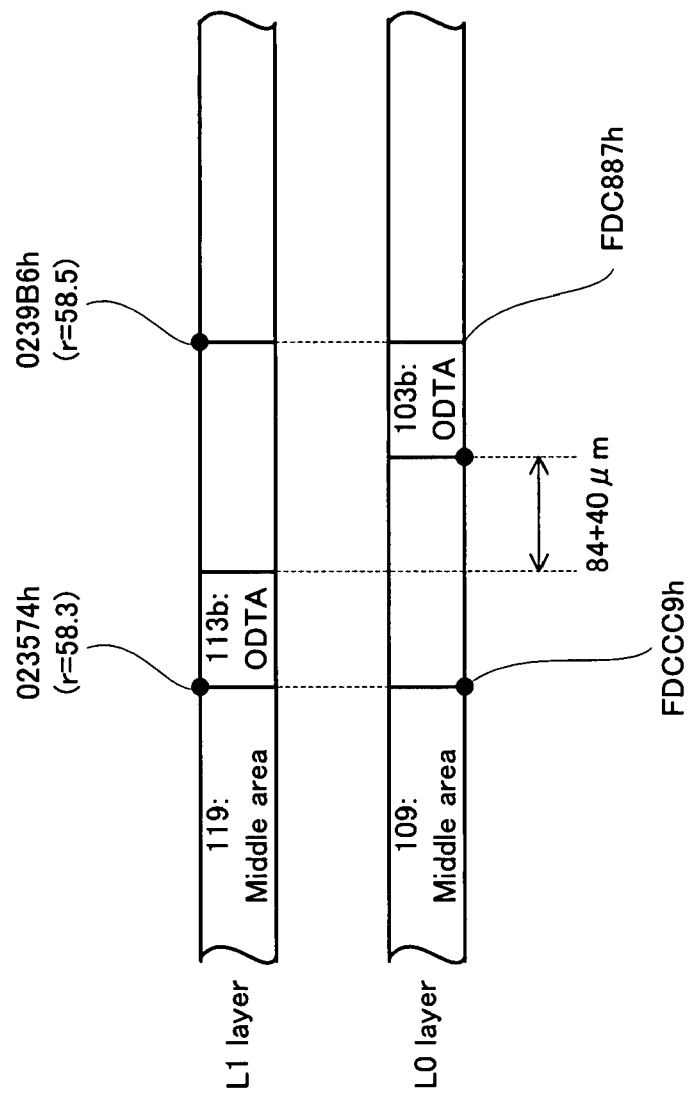

[FIG. 10]
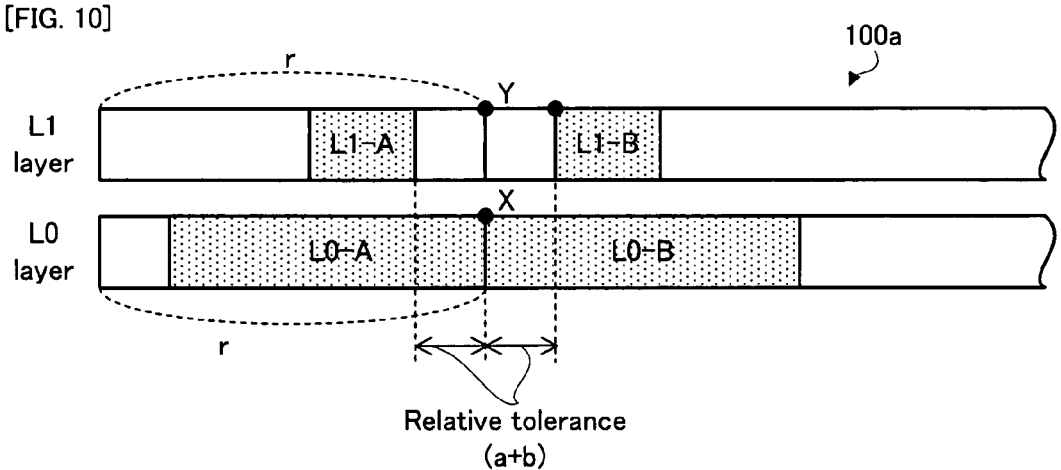
(a)
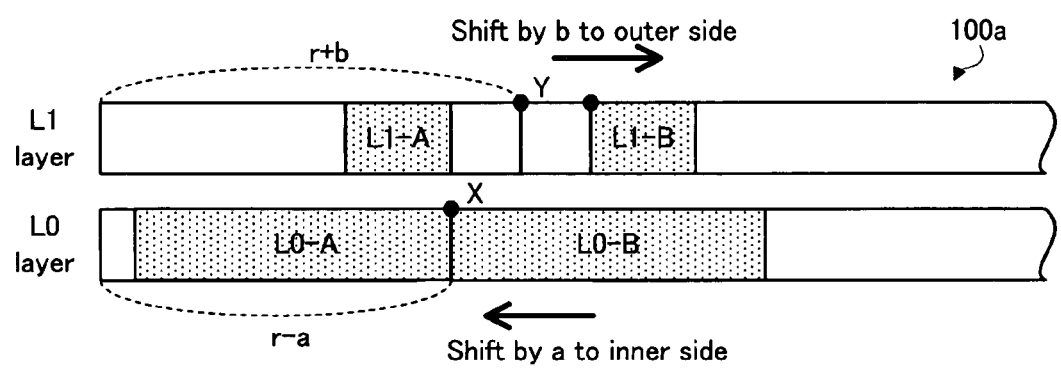
(b)
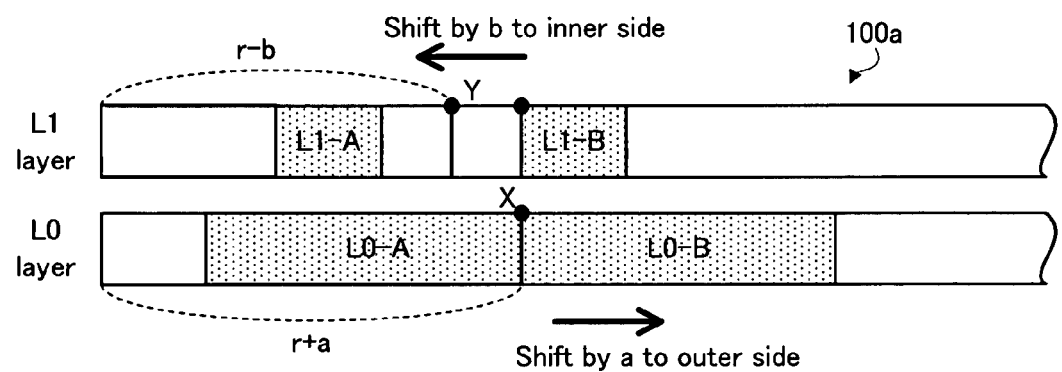
(c)

[FIG. 11]
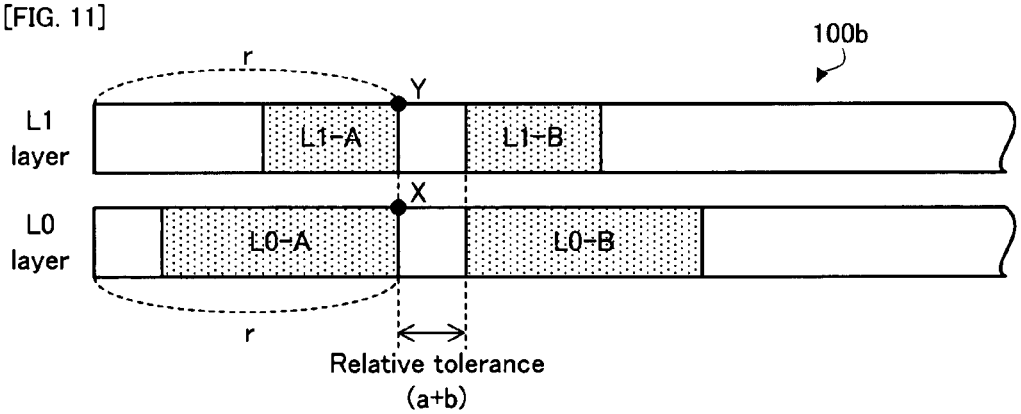
(a)
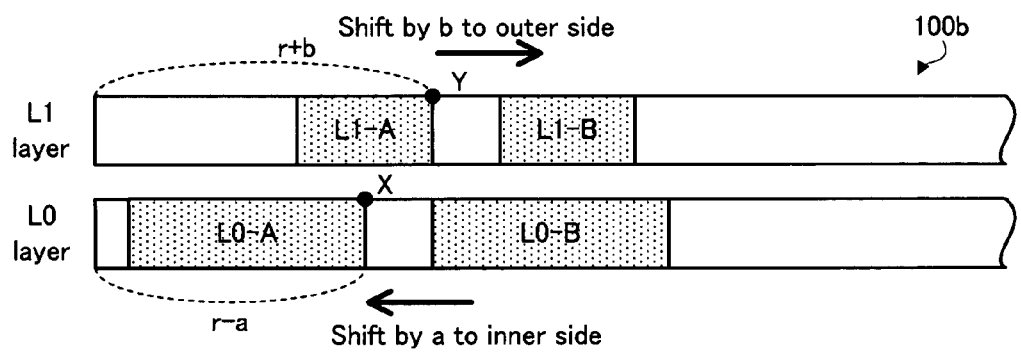
(b)
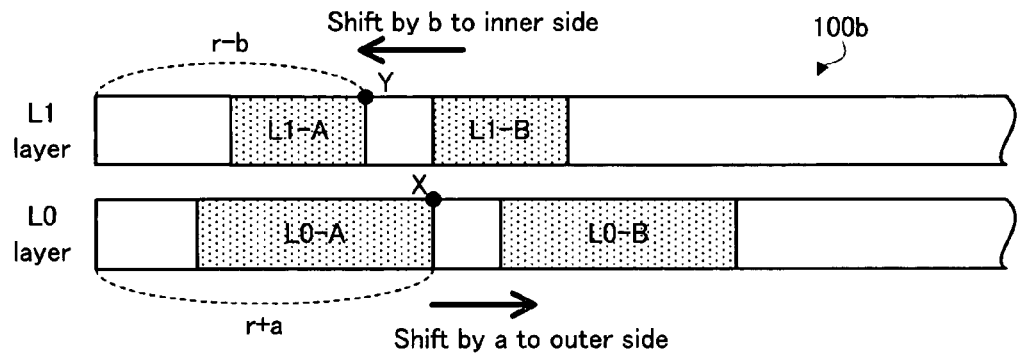
(c)

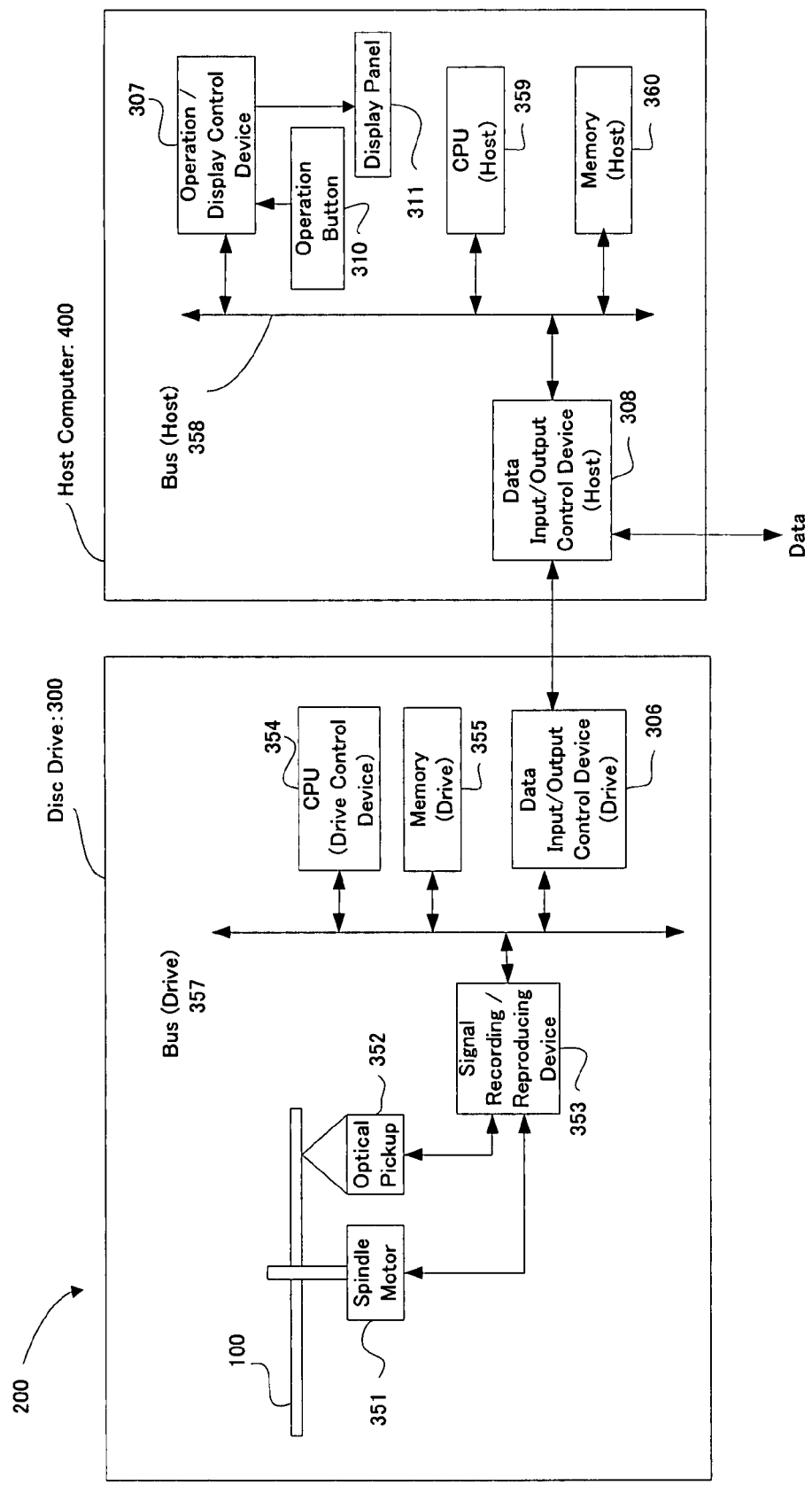
[FIG. 12]

[FIG. 13]
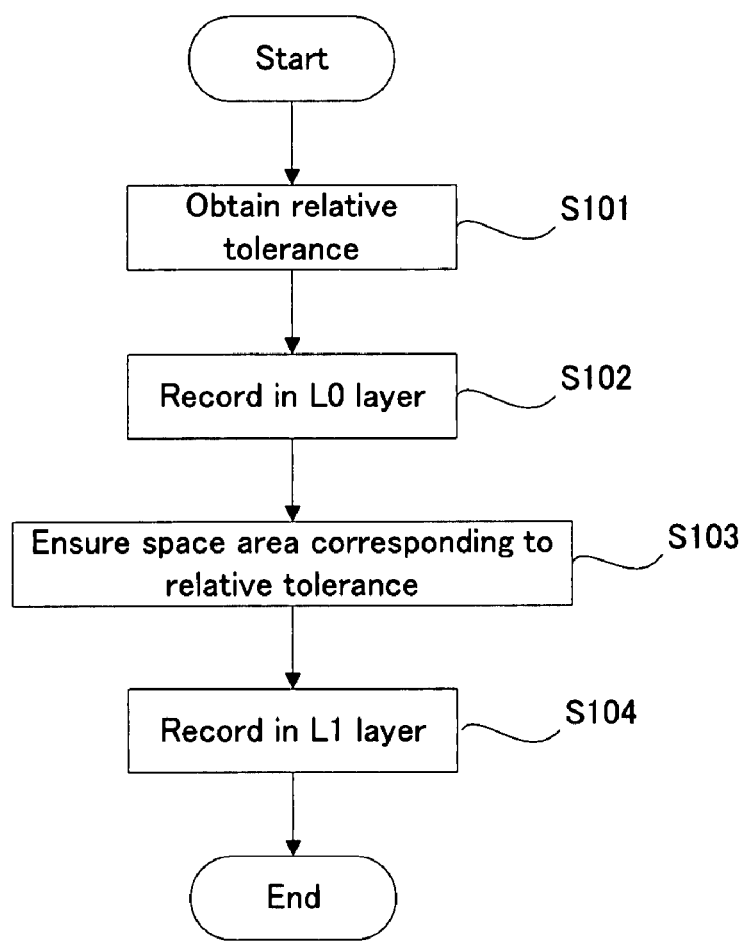

[FIG. 14]
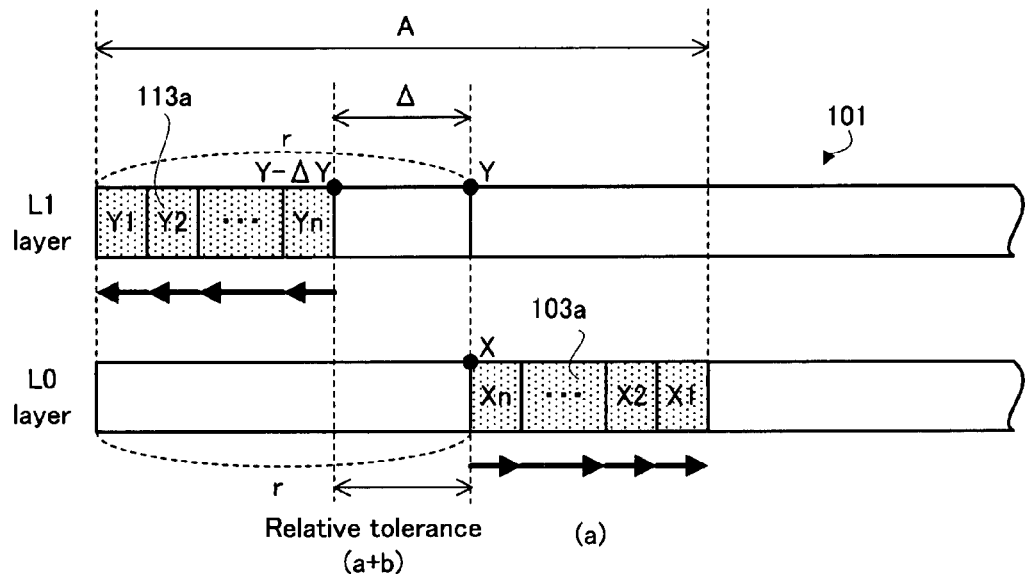
(a)
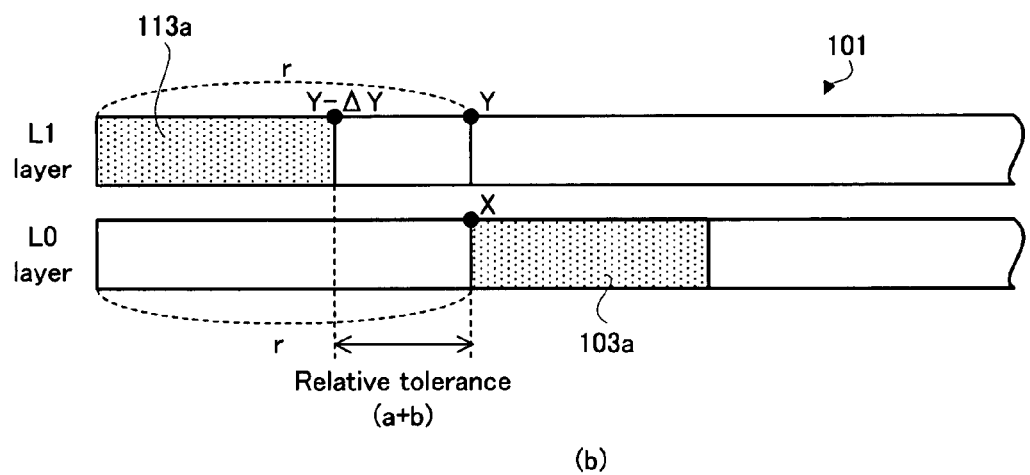
(b)
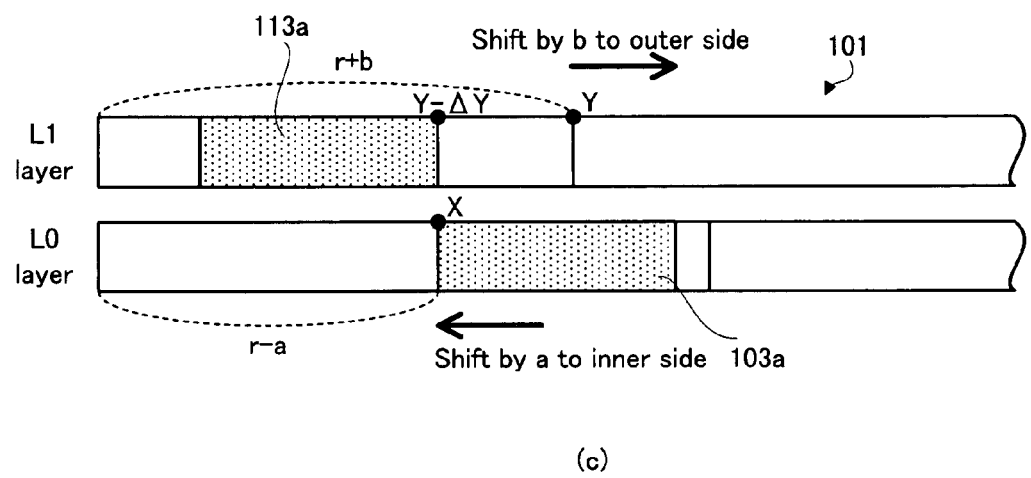
(c)

[FIG. 15]
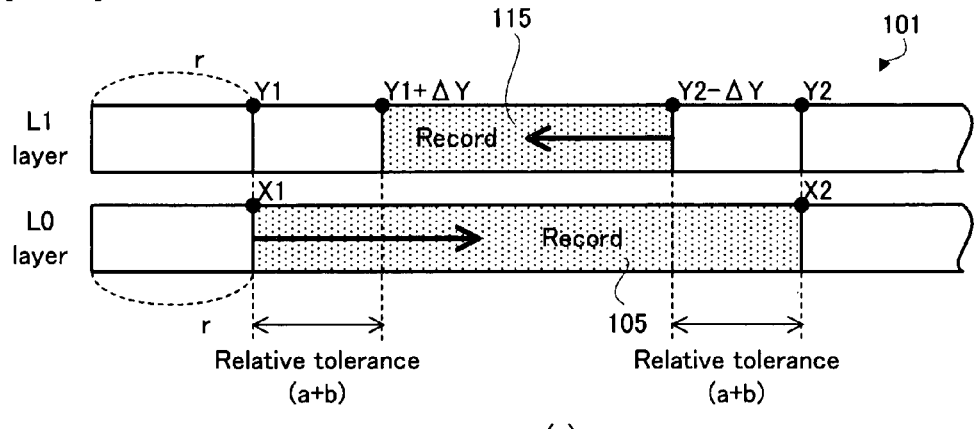
(a)
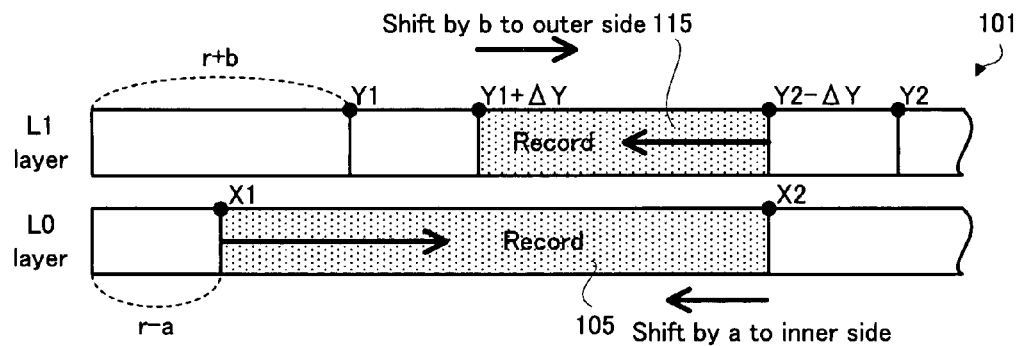
(b)
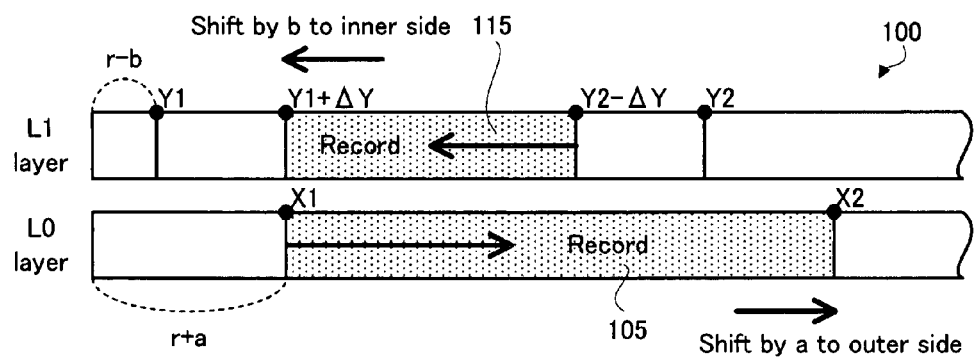
(c)

RECORDING MEDIUM, RECORDING APPARATUS AND RECORDING METHOD, AND COMPUTER PROGRAM

TECHNICAL FIELD

The present invention relates to a recording medium, such as a DVD, a recording apparatus and method, such as a DVD recorder, and a computer program which makes a computer function as the recording apparatus.

BACKGROUND ART

In an information recording medium, such as a CD-ROM (Compact Disc-Read Only Memory), a CD-R (Compact Disc-Recordable), and a DVD-ROM, for example, there is also developed an information recording medium, such as a multi-layer type or dual-layer type optical disc, in which a plurality of recording layers are laminated or pasted on the same substrate as described in patent documents 1 and 2 or the like. Then, on an information recording apparatus, such as a DVD recorder, for performing the recording with respect to the dual-layer type optical disc, laser light for recording is focused on a recording layer located on the front (i.e. on the closer side to an optical pickup) as viewed from the irradiation side of the laser light (hereinafter referred to as an "L0 layer", as occasion demands) to thereby record data into the L0 layer in an irreversible change recording method or a rewritable method by heat. Moreover, the laser light is focused on a recording layer located on the rear of the L0 layer (i.e. on the farther side from the optical pickup) as viewed from the irradiation side of the laser light (hereinafter referred to as an "L1 layer", as occasion demands), through the L0 layer or the like, to thereby record information into the L1 layer in the irreversible change recording method or the rewritable method by heat. Patent document 1: Japanese Patent Application Laid Open NO. 2000-311346 Patent document 2: Japanese Patent Application Laid Open NO. 2001-23237

DISCLOSURE OF INVENTION

Subject to be Solved by the Invention

In such a dual-layer type optical disc, if the data is recorded into the L1 layer, it is necessary to irradiate the laser light through the L0 layer. In this case, the record data may be recorded in the L0 layer, or may not be recorded. As described above, the recording state of the L0 layer is not necessarily same, which causes a change in the state of the laser light with which the L1 layer is irradiated. Thus, a method in which the L0 layer is made in a recorded state to thereby properly record the record data into the L1 layer is also invented by the present inventors or the like.

However, a position where a certain address of the L0 layer or the L1 layer is defined in design does not necessarily match a position where the certain address of the optical disc actually manufactured or produced is defined, depending on the quality of a production process. In other words, there is a possibility that an optical disc is produced in which the certain address is actually located away from a radial position where the certain address is to be located in design. Thus, a predetermined area is not disposed in an intended position in design, which results in a technical problem that the laser light is not necessarily irradiated onto the L1 layer through a recording area in the recorded state in the L0 layer.

It is therefore an object of the present invention to provide a recording medium, and a recording apparatus and method, which can preferably record data into each recording layer, for example, as well as a computer program.

Means for Solving the Subject (Recording Medium)

The above object of the present invention can be achieved by a recording medium provided with: a first recording layer including a first area (e.g. an IDTA, an ODTA described later or other areas); and a second recording layer including a second area (e.g. an IDTA, an ODTA described later or other areas), wherein an edge on one side (e.g. outer circumferential side) of the second area is located at a position obtained by shifting to an other side (e.g. inner circumferential side), different from the one side, at least by a tolerance length from an area portion of the second recording layer corresponding to an edge on the one side of the first area, or an edge on the other side of the second area is located at a position obtained by shifting to the one side at least by the tolerance length from the area portion in said second recording layer corresponding to the edge on the one side of the first area, in which the tolerance length indicates an acceptable range of a relative position shift between an address which is defined on the predetermined position in the first recording layer and an address which is related to the predetermined position in the second recording layer.

According to the recording medium of the present invention, the record information is recorded into each of the first recording layer and the second recording layer. The first recording layer includes at least the first area, and the second recording layer includes at least the second area.

Particularly in the present invention, the edge on the other side of the second area is located at a position obtained by shifting to the one side at least by the tolerance length, from the area portion in the second recording layer corresponding to the edge on the one side of the first area. This can be considered in the case where the first area and the second area do not overlap in the normal direction of the recording surface of the first recording layer (or second recording layer) in design. Namely, this can be considered in the case where the first area and the second area do not exist at the same radial position in the case of a disc-shaped recording medium. Alternatively, the edge on the one side of the second area is located at a position obtained by shifting to the other side at least by the tolerance length, from the area portion in the second recording layer corresponding to the edge on the one side of the first area. This can be considered in the case where the first area and the second area overlap in the normal direction of the recording surface of the first recording layer (or second recording layer) in design. The term "corresponding to" herein indicates that it exists at a substantially facing or opposed position in design (e.g. at substantially the same radial position). In an actual recording medium, it is not necessarily located at the facing position due to an influence or the like in the production process. The term "face" indicates a relationship that two points are actually at the same radial position. Moreover, the "tolerance length" indicates the acceptable range of a relative position shift between an address which is defined on the predetermined position (e.g. a predetermined radial position) in the first recording layer and an address which is related to the predetermined position in the second recording layer. In other words, the "tolerance length" indicates the acceptable range of a relative position shift between an address which is defined on the predetermined position in the first recording layer and an address which is defined on the predetermined position in said second recording layer. In other words more, the "tolerance length" is the sum of the acceptable range of a position shift in the first recording layer between a position where a predetermined address is defined in design and a position of the predetermined address on the actually produced recording medium; and the acceptable range of a position shift in the second recording layer between a position where a predetermined address is defined in design and a position of the predetermined address on the actually produced recording medium.

As descried above, since the edge on the other side of the second area is located at a position obtained by shifting to the one side at least by the tolerance length from the area portion in the second recording layer corresponding to the edge on the one side of the first area, even if there is a position shift or the like of the address or the like, the first area and the second area do not overlap in the normal direction of the first recording layer (or second recording layer). Therefore, it is possible to record the record information into the second area without an influence of the recording state of the first area. In the same manner, it is possible to record the record information into the first area without an influence of the recording state of the second area. In other words, it is possible to preferably record the record information into each of the plurality of recording layers.

Moreover, since the edge on the one side of the second area is located at a position obtained by shifting to the other side at least by the tolerance length from the area portion in the second recording layer corresponding to the edge on the one side of the first area, even if there is a position shift or the like of the address or the like, the edge on the one side of the second area is not located on the further one side than the edge on the one side of the first area is. In other words, even if there is a position shift or the like of the address or the like, when the record information is recorded into the second area, the laser light is irradiated through the first area. Therefore, if the record information is recorded into the second area after the record information is recorded into the first area, it is possible not to change the recording condition of the record information recorded in the second area.

As explained above, according to the recording medium of the present invention, it is possible to preferably record the record information into each recording layer.

In one aspect of the recording medium of the present invention, the edge on the one side of the second area is located at a position obtained by shifting to the other side at least by a clearance length, or the edge on the other side of the second area is located at a position obtained by shifting to the one side at least by the clearance length, in addition to the tolerance length, in which the clearance length indicates a sum of a maximum acceptable value of a spot radius of laser light on the first recording layer in the case where the laser light, which is for recoding of record information onto the recording medium, is focused on the second recording layer and a maximum acceptable value of a relative eccentric shift of the first and second recording layers.

According to this aspect, each of the first area and the second area is formed, in view of the eccentric shift and the size of the spot of the laser light or the like, in addition to the position shift of the address caused in the production process of the recording medium or the like. Therefore, it is possible to record the record information into each recording layer, more preferably.

In another aspect of the recording medium of the present invention, the tolerance length is substantially 40 µm in a radial direction of the recording medium.

According to this aspect, in the case of a DVD-R, which is one standard of the recording medium, for example, the acceptable range of the position shift in each recording layer is defined to be from −20 µm to 20 µm. Therefore, if the position shift of the first recording layer is +20 µm and the position shift of the second recording layer is −20 µm, a relative position shift of 40 µm is caused between the first recording layer and the second recording layer. In other words, a relative position shift of 40 µm at most can be caused between the first recording layer and the second recording layer. Therefore, by forming the first area and the second area on the basis of the tolerance length in view of the acceptable range, it is possible to preferably receive the above-mentioned various benefits. Of course, if a different value is determined as the acceptable range of the position shift in another standard, it is preferable to use the value instead of 40 µm.

In another aspect of the recording medium of the present invention, at least one of the first area and the second area is a calibration area (e.g. an IDTA or ODTA described later) to calibrate a recording power of a recording device which records record information onto the recording medium.

According to this aspect, it is possible to preferably record the record information into the calibration area by virtue of the above-mentioned various benefits, which can result in the preferable calibration of the recording power when the record information is recorded.

In another aspect of the recording medium of the present invention, record information is recorded into said first recording layer in one direction, and the record information is recorded into said second recording layer in another direction different from the one direction. In other words, the record information is recorded into the first recording layer from the one side to the other side or from the other side to the one side, and the record information is recorded into the second recording layer to a side different from a side where the record information is recorded in the first recording layer.

According to this aspect, it is possible to receive the above-mentioned various benefits on the recording medium in an opposite track path method.

(Recording Apparatus)

The above object of the present invention can be also achieved by a recording apparatus provided with: a recording device for recoding record information onto a recording medium provided with a first recording layer and a second recording layer; and a controlling device for controlling the recording device to record the record information, with at least an interval (e.g. a space area in which the record information is not recorded, etc.) of a tolerance length between an area portion in the second recording layer corresponding to an edge on one side of an area portion in the first recording layer in which the record information is recorded and an edge on an other side, different from the one side, of an area portion in the second recoding layer in which the record information is recorded or between the area portion in the second recording layer corresponding to the edge on the one side of the area portion in the first recording layer in which the record information is recorded and an edge on the one side of an area portion in the second recording layer in which the record information is recorded, in which the tolerance length indicates an acceptable range of a relative position shift between an address which is defined on the predetermined position in the first recording layer and an address which is related to the predetermined position in the second recording layer.

According to the recording apparatus of the present invention, by the operation of the recording device, it is possible to preferably record the record information including video information, audio information or the like, onto the recording medium provided with both the first and second recording layers. For example, by irradiating the laser light so as to focus on the first recording layer, the record information is recorded into the first recording layer, while by irradiating the laser light so as to focus on the second recording layer, the record information is recorded into the second recording layer.

Particularly, in the present invention, the recording device is controlled by the operation of the controlling device. By this, the record information is recorded, with at least an interval (specifically, a space area) of a tolerance length between the area portion in the second recording layer corresponding to the edge on the one side of the area portion in the first recording layer in which the record information is recorded and the edge on the other side of the area portion in the second recoding layer, which may be located on the one side, in which the record information is recorded. Alternatively, the record information is recorded, with at least an interval (specifically, a space area) of a tolerance length between the area portion in the second recording layer corresponding to the edge on the one side of the area portion in the first recording layer in which the record information is recorded and the edge on the one side of the area portion in the second recording layer, which may be located on the other side, in which the record information is recorded.

By this, an area structure on the recording medium on which the record information is recorded by the recording apparatus of the present invention becomes the same as that of the above-mentioned recording medium of the present invention. Therefore, according to the recording apparatus of the present invention, it is possible to preferably record the record information into each recording layer.

In one aspect of the recording apparatus of the present invention, the controlling device controls the recording device to record the record information, with an interval of a clearance length in addition to the tolerance length, in which the clearance length indicates a sum of a maximum acceptable value of a spot radius of laser light on the first recording layer in the case where the laser light, which is for recoding of the record information onto the recording medium, is focused on the second recording layer and a maximum acceptable value of a relative eccentric shift of the first and second recording layers.

According to this aspect, the record information is recorded into each of the first and second recording layers, in view of the eccentric shift and the size of the spot of the laser light or the like, in addition to the position shift of the address caused in the production process of the recording medium or the like. Therefore, it is possible to record the record information into each recording layer, more preferably.

In another aspect of the recording apparatus of the present invention, the controlling device controls the recording device to record the record information, with an interval of the tolerance length, on the basis of tolerance information which indicates the tolerance length recorded on the recording medium.

According to this aspect, it is possible to perform the above-mentioned recording operation, relatively easily, by referring to the tolerance information recorded on the recording medium.

In another aspect of the recording apparatus of the present invention, the recording apparatus is further provided with a storing device for storing tolerance information which indicates the tolerance length.

According to this aspect, it is possible to perform the above-mentioned recording operation, relatively easily, by referring to the tolerance information stored in the storing device.

In another aspect of the recording apparatus of the present invention, the tolerance length is substantially 40 μm in a radial direction of the recording medium.

According to this aspect, the record information is recorded, as described above, on the basis of the tolerance length in view of the acceptable range. Thus, it is possible to preferably receive the above-mentioned various benefits. Of course, if a different value is determined as the acceptable range of the position shift in another standard, it is preferable to use the value instead of 40 μm.

In another aspect of the recording apparatus of the present invention, the controlling device controls the recording device to record the record information with an interval of the tolerance length, in recording the record information into at least one of a calibration area to calibrate a recording power of the recording device, an area portion close to the calibration area, and an area portion which faces the close area portion.

According to this aspect, it is possible to preferably record the record information into the calibration area by virtue of the above-mentioned various benefits, which can result in the preferable calibration of the recording power when the record information is recorded.

In another aspect of the recording apparatus of the present invention, the record information is recorded into the first recording layer in one direction, and the record information is recorded into the second recording layer in another direction different from the one direction.

According to this aspect, it is possible to receive the above-mentioned various benefits on the recording medium in the opposite track path method.

(Recording Method)

The above object of the present invention can be also achieved by a recording method in a recording apparatus provided with a recording device for recoding record information onto a recording medium provided with a first recording layer and a second recording layer, the recording method provided with: a first controlling process of controlling the recording device to record the record information into the first recording layer and the second recording layer; and a second controlling process of controlling the recording device to record the record information, with at least an interval of a tolerance length between an area portion in the second recording layer corresponding to an edge on one side of an area portion in the first recording layer in which the record information is recorded and an edge on an other side, different from the one side, of an area portion in the second recoding layer in which the record information is recorded or between the area portion in the second recording layer corresponding to the edge on one side of an area portion in the first recording layer in which the record information is recorded and an edge on the one side of an area portion in the second recording layer in which the record information is recorded, in which the tolerance length indicates an acceptable range of a relative position shift between an address which is defined on the predetermined position in the first recording layer and an address which is related to the predetermined position in the second recording layer.

According to the recording method of the present invention, it is possible to receive the same benefits as those owned by the above-mentioned recording apparatus of the present invention.

Incidentally, in response to the various aspects of the above-mentioned recording apparatus of the present invention, the recording method of the present invention can adopt various aspects.

(Computer Program)

The above object of the present invention can be also achieved by a computer program for recording control to control a computer provided in the above-mentioned recording apparatus of the present invention (including its various aspects), to make the computer function as at least one portion of the recording apparatus (specifically, e.g. the controlling device).

According to the computer program of the present invention, the above-mentioned recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the above-mentioned recording apparatus of the present invention, the computer program of the present invention can adopt various aspects.

The above object of the present invention can be also achieved by a computer program product in a computer-readable medium for tangibly embodying a program of instructions executable by a computer provided in the above-mentioned recording apparatus of the present invention (including its various aspects), to make the computer function as at least one portion of the recording apparatus (specifically, e.g. the controlling device).

According to the computer program product of the present invention, the above-mentioned recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned recording apparatus.

These effects and other advantages of the present invention will become more apparent from the following embodiments.

As explained above, in the recording medium of the present invention, the edge on the other side of the second area is located at a position obtained by shifting to the one side by the tolerance length from the area portion of the second recording layer corresponding to the edge on the one side of the first area. Therefore, it is possible to preferably record the record information into each recording layer. Moreover, the recording apparatus of the present invention is provided with the recording device, and the controlling device. The recording method of the present invention is provided with the first controlling process and the second controlling process. Therefore, it is possible to preferably record the record information into each recording layer.

BRIEF DESCRIPTION OF DRAWINGS

FIG. 1 is a substantial plan view showing the basic structure of an optical disc in an embodiment of the present invention.

FIG. 2 is a schematic cross sectional view of the optical disc in the embodiment and a corresponding conceptual diagram showing a recording area structure in the radial direction thereof.

FIG. 3 are data structural diagrams conceptually showing a specific area structure of the optical disc in the embodiment.

FIG. 4 are schematic conceptual views conceptually showing a relative tolerance.

FIG. 5 are schematic conceptual views conceptually showing an eccentric clearance out of clearance.

FIG. 6 are schematic conceptual views conceptually showing a spot clearance out of clearance.

FIG. 7 are data structural diagrams particularly showing a radial position relationship of actual areas on the optical disc, depending on the extent of a position tolerance.

FIG. 8 is a data structural diagram showing the specific address value and the radial position of each area, disposed on the most inner circumferential side.

FIG. 9 is a data structural diagram showing the specific address value and the radial position of each area, disposed on the most outer circumferential side.

FIG. 10 are data structural diagrams conceptually showing another specific area structure on the optical disc.

FIG. 11 are data structural diagrams conceptually showing another specific area structure on the optical disc.

FIG. 12 is a block diagram conceptually showing the basic structure of a recording/reproducing apparatus in the embodiment.

FIG. 13 is a flowchart conceptually showing a flow of the recording operation of the recording/reproducing apparatus in the embodiment.

FIG. 14 are data structural diagrams conceptually showing an aspect of recording the data on the optical disc.

FIG. 15 are data structural diagrams conceptually showing an aspect of recording the data on the optical disc.

DESCRIPTION OF REFERENCE CODES

100 optical disc
102 lead-in area
103*a*, 113*a* IDTA
103*b*, 113*b* ODTA
104, 114 RMA
105, 115 data area
106 NBCA
118 lead-out area
109, 119 middle area
200 recording/reproducing apparatus
352 optical pickup
353 signal recording/reproducing device
354, 359 CPU
355, 360 memory

BEST MODE FOR CARRYING OUT THE INVENTION

Hereinafter, the best mode for carrying out the present invention will be discussed in order for each embodiment, with reference to the drawings.

(Embodiment of Recording Medium)

At first, with reference to FIG. 1 to FIG. 11, an optical disc as an embodiment according to the recording medium of the present invention will be discussed.

(1) Basic Structure

At first, with reference to FIG. 1 and FIG. 2, an explanation will be given to the basic structure of the optical disc as being an embodiment according to the recording apparatus of the present invention. FIG. 1 is a substantial plan view showing the basic structure of an optical disc 100 in the embodiment, and FIG. 2 is a schematic cross sectional view of the optical disc 100 and a corresponding conceptual diagram showing a recording area structure in the radial direction thereof.

As shown in FIG. 1, the optical disc 100 has a recording surface on a disc main body with a diameter of about 12 cm, as is a DVD. On the recording surface, the optical disc 100 is provided with: a center hole 101 as being the center; a lead-in area 102 and a lead-out area 118; data areas 105 and 115; and middle areas 109 and 119. Then, in the optical disc 100, recording layers and the like are laminated on a transparent substrate 110, for example. In each recording area of the recording layers, a track or tracks, such as groove tracks and land tracks, are alternately placed, spirally or concentrically, with the center hole 101 as the center. Moreover, on the track, data is divided by a unit of ECC block and recorded. The ECC block is a data management unit by which the recording information can be error-corrected.

Incidentally, the present invention is not particularly limited to the optical disc having the three areas as described above. For example, even if the lead-in area 102, the lead-out area 118 or the middle area 109 (119) do not exist, a data structure and the like explained below can be constructed. Moreover, as described later, the lead-in area 102, the lead-out area 118 or the middle area 109 (119) may be further segmentized.

Particularly, the optical disc 100 in the embodiment, as shown in FIG. 2, has such a structure that an L0 layer and an L1 layer, which constitute one example of the "first and second recording layers" of the present invention, respectively, are laminated on the transparent substrate 110. Upon the recording and reproduction of such a dual-layer type optical disc 100, the data recording/reproduction in the L0 layer or the L1 layer is performed, depending on which recording layer has the focus position of laser light LB, irradiated from the lower side to the upper side in FIG. 2. In particular, in the L0 layer, the data is recorded from the inner to the outer circumferential side, while in the L1 layer, the data is recorded from the outer to the inner circumferential side. In other words, the optical disc 100 in the embodiment corresponds to an optical disc in the opposite track path method. Even an optical disc in a parallel track path method can also receive various benefits described later, by adopting a structure discussed below.

The optical disc 100 in the embodiment is provided with IDTA (Inner Disc Testing Areas) 103a and 113a, RMA (Recording Management Areas) 104 and 114, and a NBCA (Narrow Burst Cutting Area) 106, if necessary by a disc maker, on the inner circumferential side of the lead-in area 102 and the lead-out area 118. Moreover, it is provided with ODTA (Outer Disc Testing Areas) 103b and 113b on the outer circumferential side of the middle areas 109 and 119.

The IDTA 103a and 113a and the ODTA 103b and 113b are recording areas to perform an OPC (Optimum Power Control) process of adjusting (or calibrating) the laser power of laser light LB, in recording the data onto the optical disc 100. An OPC pattern is recorded into the IDTA 103a and 113a or the ODTA 103b and 113b while the laser power is changed in stages and the reproduction quality (e.g. asymmetry, etc.) of the recorded OPC pattern is measured, by which an optimum laser power in recording the data is calculated. In particular, the optimum laser power in recording the data into a recording area on the relatively inner circumferential side of the optical disc is preferably calculated by recording the OPC pattern into the IDTA 103a and 113a. Moreover, the optimum laser power in recording the data into a recording area on the relatively outer circumferential side of the optical disc is preferably calculated by recording the OPC pattern into the ODTA 103b and 113b. In order to preferably perform the OPC process without influence of the other recording layer, when the OPC process is performed by using the IDTA 113a or the ODTA 113b of the L1 layer, the laser light LB is irradiated through the L0 layer in which the data is unrecorded, to thereby record the OPC pattern. Obviously, the same is true for the IDTA 103a and the ODTA 103b of the L0 layer.

Particularly, in the recording area in which the normal data is recorded, such as the data areas 105 and 115, of the optical disc 100, the data is recorded into the data area 115 of the L1 layer after the data is recorded into the data area 105 of the L0 layer, as a general rule. In other words, by irradiating the laser light LB through the data area 105 of the L0 layer in which the data is recorded, the data is recorded into the data area 115 of the L1 layer. The same is true for other recording areas, as a general rule.

The RMA 104 and 114 are recording areas to record therein various management information for managing the recording of the data onto the optical disc 100. Specifically, the management information or the like which indicates the arrangement or the recording state or the like of the data recorded on the optical disc 100, for example, is recorded.

In the NBCA 106, various identification data is recorded, which is to identify the optical disc 100, including the production number or the like of the optical disc 100, for example. In particular, the various identification data is recorded by a cutting pattern in a bar code shape which is formed on the recording surface of the optical disc 100 by the laser light.

Moreover, the optical disc 100 in the embodiment is not limited to a dual-layer, single-sided type, but may be a dual-layer, double-sided type. Furthermore, the optical disc 100 in the embodiment is not limited to the optical disc having the two recording layers, as described above, but may be an optical disc of a multilayer type which has three or more layers.

Moreover, the above explanation is made as if the positions of the middle areas 109 and 119 were already fixed; however, in an actual finalize process, the middle areas 109 and 119 may be disposed on the further inner circumferential side. Even in that case, it is preferable to satisfy an aspect of the arrangement of the area, discussed below.

(2) Specific Area Structure

Next, with reference to FIG. 3 to FIG. 9, the specific area structure of the optical disc 100 in the embodiment will be discussed. Here, the outline of the specific area structure will be explained by using FIG. 3, and supplementary or more detailed explanation will be given by using FIG. 4 to FIG. 9. FIG. 3 are data structural diagrams conceptually showing the specific area structure of the optical disc 100.

As shown in FIG. 3(a), the edge on the outer circumferential side of the IDTA 113a in the L1 layer and the edge on the inner circumferential side of the IDTA 103a in the L0 layer are away from each other in the radial direction by a length corresponding to a relative tolerance which constitutes one specific example of the "tolerance length" of the present invention. More specifically, an area portion in the L0 layer corresponding to the edge on the outer circumferential side of the IDTA 113a in the L1 layer and the edge on the inner circumferential side of the IDTA 103a in the L0 layer are away from each other in the radial direction by the length corresponding to the relative tolerance. In other words, the edge on the inner circumferential side of the IDTA 103a in the L0 layer is disposed at a position obtained by shifting to the outer circumferential side, by the length corresponding to the relative tolerance, from the area portion in the L0 layer corresponding to the edge on the outer circumferential side of the IDTA 113a in the L1 layer. Moreover, the edge on the inner circumferential side of the RMA 114 in the L1 layer and the edge on the outer circumferential side of the IDTA 103a in the L0 layer are away from each other in the radial direction by the length corresponding to the relative tolerance. As described above, the recording area in the L0 layer and the recording area in the L1 layer, in which overlapping each other as viewed from the irradiation side of the laser light LB (i.e. in a direction perpendicular to the recording surface of the optical disc 100) causes a disadvantage, are disposed so as to provide therebetween a space area having a length in the radial direction corresponding to the relative tolerance. In particular, the radial position of the recording area in the L0 layer and the radial position of the recording area in the L1 layer, between which the space area having the length in the radial direction corresponding to the relative tolerance is provided, are next to or close to each other.

Incidentally, the relative tolerance indicates the sum of (i) the acceptable range of a position shift between a position where a predetermined address is to be originally disposed in design and a position where the predetermined address is actually disposed on the optical disc 100 in the L0 layer; and (ii) the acceptable range of a position shift between a position where a predetermined address is to be originally disposed in design and a position where the predetermined address is actually disposed on the optical disc 100 in the L1 layer. Namely, the relative tolerance indicates the acceptable range of a relative position shift (or the relative position shift itself) between (i) the address which is defined on a predetermined radial position in the L0 layer and (ii) the address which is related to the predetermined radial position in the L1 layer (i.e. the address which is defined on the predetermined radial position in the L1 layer).

Alternatively, more preferably, as shown in FIG. 3(*b*), the edge on the outer circumferential side of the IDTA 113a in the L1 layer and the edge on the inner circumferential side of the IDTA 103a in the L0 layer are away from each other in the radial direction by a length corresponding to the sum of the relative tolerance and a clearance. More specifically, an area portion in the L0 layer corresponding to the edge on the outer circumferential side of the IDTA 113a in the L1 layer and the edge on the inner circumferential side of the IDTA 103a in the L0 layer are away from each other in the radial direction by the length corresponding to the sum of the relative tolerance and the clearance. In other words, the edge on the inner circumferential side of the IDTA 103a in the L0 layer is disposed at a position obtained by shifting to the outer circumferential side, by the length corresponding to the sum of the relative tolerance and the clearance, from the area portion in the L0 layer corresponding to the edge on the outer circumferential side of the IDTA 113a in the L1 layer. Moreover, the edge on the inner circumferential side of the RMA 114 in the L1 layer and the edge on the outer circumferential side of the IDTA 103a in the L0 layer are away from each other in the radial direction by the length corresponding to the sum of the relative tolerance and the clearance. As described above, more preferably, the recording area in the L0 layer and the recording area in the L1 layer, in which overlapping each other as viewed from the irradiation side of the laser light LB causes a disadvantage, are disposed so as to provide therebetween a space area having a length in the radial direction corresponding to the sum of the relative tolerance and the clearance. In the explanation below, even if the "relative tolerance" is discussed, such a "clearance" is preferably considered.

Incidentally, the clearance in the embodiment corresponds to the sum of a clearance related to an eccentricity corresponding to a shift of the center positions or the like of the L0 layer and the L1 layer (hereinafter referred to as an "eccentric clearance", as occasion demands) and a clearance related to the size of a beam spot of the defocused laser light (hereinafter referred to as a "spot clearance", as occasion demands).

Incidentally, according to the specific area structure in FIG. 3(*a*) and FIG. 3(*b*), if the IDTA 103a in the L0 layer constitutes one specific example of the "first area" of the present invention, the IDTA 113a in the L1 layer constitutes one specific example of the "second area" of the present invention. Moreover, if the IDTA 103a in the L0 layer constitutes one specific example of the "first area" of the present invention, the RMA 114 in the L1 layer constitutes one specific example of the "second area" of the present invention. However, any recording areas, in which overlapping each other as viewed from the irradiation side of the laser light LB causes a disadvantage and whose radial positions are next to or close to each other, can constitute one specific example of the "first area" and the "second area" of the present invention, as occasion demands, depending on the relationship.

Now, the relative tolerance and the clearance will be discussed in more detail with reference to FIG. 4 to FIG. 6. FIG. 4 are schematic conceptual views conceptually showing the relative tolerance. FIG. 5 are schematic conceptual views conceptually showing the eccentric clearance out of the clearance. FIG. 6 are schematic conceptual views conceptually showing the spot clearance out of the clearance.

As shown in FIG. 4(*a*), it is assumed that an address "X" is defined at a radial position "r" in design. By this, the arrangement of the lead-in area 101, the data areas 105 and 115, the lead-out area 118 and the middle areas 109 and 119 is defined, in design. At this time, there is likely a case where the address "X" is not accurately defined at the radial position "r" where the address "X" is to be originally defined, due to manufacturing errors of a stampa or the like, which is to form a land pre-pit or wobble which defines the address; in other words, due to manufacturing errors of an original disc for producing the stampa, errors in the radial position of a cutting machine for generating the original disc, uneven track pitches, or the like. Alternatively, there is likely a case where the address "X" is not accurately defined at the radial position "r" where the address "X" is to be originally disposed, due to an individual difference in heat contraction or the like in the production of the optical disc 100.

Specifically, as shown in FIG. 4(*b*), it is likely that an address "X+$\Delta$X" is defined at the radial position "r" where the address "X" is to be originally disposed. At this time, the address "X" is disposed at a radial position "r−$\Delta$r1" obtained by shifting from the radial position "r" to the inner circumferential side by "$\Delta$r1". This "$\Delta$r1" is referred to the position shift in each recording layer. The position shift is likely caused in each recording layer. Namely, the position shift in the L0 layer and the position shift in the L1 layer can be caused, separately and independently. In this case, the acceptable range of the position shift can be determined from the viewpoint of security of the preferable recording operation or reproduction operation. For example, in a DVD-R, which is one specific example of the optical disc 100, the acceptable range of the position shift is determined to be from −20 µm to 20 µm. The acceptable range of the position shift is referred to a "position tolerance", as occasion demands. On the basis of the acceptable range, the sum of the acceptable range of the position shift in the L0 layer and the acceptable range of the position shift in the L1 layer (i.e. the sum of the position tolerance in the L0 layer and the position tolerance in the L1 layer) is the relative tolerance. In this case, the relative tolerance is 20+20=40 µm.

Incidentally, the sum of the actual position shift of the L0 layer and the actual position shift of the L1 layer may be regarded as the relative tolerance. In other words, the sum of the maximum value of the position shift actually caused in the L0 layer and the maximum value of the position shift actually caused in the L1 layer may be regarded as the relative tolerance of the optical disc 100.

As shown in FIG. 5(*a*), in the case of the optical disc 100 without a relative eccentricity between the L0 layer and the L1 layer (hereinafter referred to a "relative eccentricity"), a track defined at the radial position "r" in the L0 layer and a track defined at the radial position "r" in the L1 layer are in such a relationship that they face (or are opposed) to each other on the track of radial position "r". Incidentally, the eccentricity is a relative shift of the L0 layer and the L1 layer, caused by a shift of the center positions of the both layers, a position shift of the center positions in pasting the L0 layer and the L1 layer, or the like.

On the other hand, as shown in FIG. 5(*b*), in the case of the optical disc 100 with an eccentricity, a track defined at the radial position "r" in the L1 layer and a track defined at the radial position "r" in the L0 layer face only at two points on the track of radial position "r". In other words, the track of the L1 layer and the track of the L0 layer, which are to be originally defined at the facing positions, do not face in most places. Moreover, there arise a part of the track defined at the radial position "r" in the L0 layer which is located on the outer circumferential side of the track defined at the radial position "r" in the L1 layer, and on the contrary, a part of the track defined at the radial position "r" in the L0 layer which is located on the inner circumferential side of the track defined at the radial position "r" in the L1 layer. Here, "Δr2" is the relative eccentricity. As shown in FIG. 5(*c*), it is assumed that the radius of a track in the L0 layer corresponding to the track defined at the radius "r" in the L1 layer is set to "r+Δr2". Then, as shown in FIG. 5(*d*), even if the relative eccentricity "Δr2" is caused, that does not cause the case where the track defined at the radius "r" in the L1 layer is located on the outer side of the track defined by the radius "r+Δr2" in the L0 layer. Moreover, by setting the radius of a track in the L0 layer corresponding to the track defined at the radius "r" in the L1 layer to "r−Δr2", even if the relative eccentricity "Δr2" is caused, that does not cause the case where the track defined at the radius "r" in the L1 layer is located on the inner side of the track defined by the radius "r−Δr2" in the L0 layer. This "Δr2" introduced in FIG. 5(*c*) is the "eccentric clearance". The maximum acceptable value of the relative eccentricity is regarded as the value of the eccentric clearance.

Moreover, as shown in FIG. 6(*a*), if the laser light LB is focused on the L1 layer, a beam spot with a predetermined radius of "Δr3" is formed on the L0 layer. Now, as described above, a case where the data is recorded into the L1 layer by irradiating the L1 layer with the laser light LB through the L0 layer in which the data is recorded, is considered. As shown in FIG. 6(*a*), in the case where the data is recorded until an address "X" of the L0 layer, if the laser light LB is focused on an address "Y" of the L1 layer which faces the address "X", the L1 layer is irradiated with the left half of the laser light LB through the L0 layer in which the data is recorded, while the L1 layer is irradiated with the right half of the laser light LB through the L0 layer in which the data is unrecorded. Therefore, only by recording the data into the L1 layer which faces the L0 layer in which the data is recorded, it is difficult or impossible to preferably record the data into the L1 layer by irradiating the L1 layer with the laser light LB through the L0 layer in which the data is recorded.

Thus, as shown in FIG. 6(*b*), it is necessary to shift the focus position of the laser light LB in the case where the data is recorded into the L1 layer, to the inner circumferential side, by a distance corresponding to the radius "Δr3" of the beam spot, from the position represented by the address "Y" of the L1 layer which faces the address "X" of the L0 layer in which the data is recorded. Specifically, it is necessary to focus the laser light LB on a position represented by an address "Y−ΔX" obtained by shifting to the inner circumferential side by a variable "ΔX" of the address corresponding to the radius "Δr3" of the beam spot. This "Δr3" introduced in FIG. 6 is the "spot clearance". The maximum acceptable value of the radius "Δr3" of the beam spot is regarded as the value of the spot clearance.

If "Δr2" in FIG. 5 is regarded as the maximum acceptable value of the relative eccentric shift between the L0 layer and the L1 layer and "Δr3" in FIG. 6 is regarded as the maximum acceptable value of the beam spot in the L0 layer in the case where the laser light LB is focused on the L1 layer, the clearance in FIG. 3 corresponds to the sum of the eccentric clearance "Δr2" in FIG. 5 and the spot clearance "Δr3" in FIG. 6.

As explained above, a space area having a length in the radial direction corresponding to the relative tolerance (or the sum of the relative tolerance and the clearance) is disposed between the recording area in the L0 layer and the recording area in the L1 layer, whose radial positions are next to or close to each other and in which overlapping each other as viewed from the irradiation side of the laser light LB causes a disadvantage. By this, a situation explained by using FIG. 7 is realized, depending on the extent of the position shift in each of the L0 layer and the L1 layer. FIG. 7 are data structural diagrams particularly showing a radial position relationship of actual areas on the optical disc, depending on the extent of the position shift (or position tolerance).

Incidentally, in the explanation of FIG. 7, the maximum value in the acceptable range of the position shift in the L0 layer is "a", and the maximum value in the acceptable range of the position shift in the L1 layer is "b". Therefore, in this case, the relative tolerance is "a+b".

At first, an explanation will be given to the case where the position shift in the L0 layer and the position shift in the L1 layer are both "0" (i.e. relative position shift is "0"). At this time, it is assumed that the address "X" in the L0 layer defined at the radial position "r" and the address "Y" in the L1 layer defined at the radial position "r" are in such a relationship that they correspond to each other. For example, it is assumed that "X" and "Y" are in a complement number relationship with each other and that "X" and "Y" are in such a relationship that they are defined at facing positions (the same radial positions) in design. Since the position shift in the L0 layer and the position shift in the L1 layer are both "0", even on the actual optical disc 100, as shown in FIG. 7(*a*), an area portion in the L0 layer represented by the address "X" and an area portion in the L1 layer represented by the address "Y" are in such a relationship that they face (or are opposed) to each other. In other words, each area is disposed at the radial position defined in design. Therefore, it is possible to record the OPC pattern into the IDTA 113*a* in the L1 layer which faces the L0 layer in which the data is not recorded (i.e. unrecorded). Namely, it is possible to record the OPC pattern into the IDTA 113*a* by irradiating the laser light LB through the L0 layer in which the data is not recorded. In the same manner, it is possible to record the OPC pattern into the IDTA 103a in the L0 layer which faces the L1 layer in which the data is not recorded.

On the other hand, the case where the position shift of the L0 layer is a negative maximum value "−a" and the position shift of the L1 layer is a positive maximum value "+b" will be explained. Namely, an explanation will be given to the case where the radial position where the address is actually defined is shifted by "a" to the inner circumferential side from the radial position where the address is originally to be defined in the L0 layer and the radial position where the address is actually defined is shifted by "b" to the outer circumferential side from the radial position where the address is originally to be defined in the L1 layer. In this case, as shown in FIG. 7(b), the address "X" in the L0 layer which is originally to be defined at the radial position "r" is defined at a radial position "r−a". Moreover, the address "Y" in the L1 layer which is originally to be defined at the radial position "r" is defined at a radial position "r+b". Along with this, the radial position of each area in the L0 layer and the L1 layer differs from the radial position defined in design, shown in FIG. 7(a). Thus, for example, the edge on the outer circumferential side of the IDTA 113a in the L1 layer faces the edge on the inner circumferential side of the IDTA 103a in the L0 layer. Even in this case, however, it is possible to record the OPC pattern into the IDTA 113a in the L1 layer which faces the L0 layer in which the data is not recorded. In the same manner, it is possible to record the OPC pattern into the IDTA 103a in the L0 layer which faces the L1 layer in which the data is not recorded.

On the other hand, the case where the position shift of the L0 layer is a positive maximum value "+a" and the position shift of the L1 layer is a negative maximum value "−b" will be explained. Namely, an explanation will be given to the case where the radial position where the address is actually defined is shifted by "a" to the outer circumferential side from the radial position where the address is originally to be defined in the L0 layer and the radial position where the address is actually defined is shifted by "b" to the inner circumferential side from the radial position where the address is originally to be defined in the L1 layer. In this case, as shown in FIG. 7(c), the address "X" in the L0 layer which is originally to be defined at the radial position "r" is defined at a radial position "r+a". Moreover, the address "Y" in the L1 layer which is originally to be defined at the radial position "r" is defined at a radial position "r−b". Along with this, the radial position of each area in the L0 layer and the L1 layer differs from the radial position defined in design, shown in FIG. 7(a). Thus, for example, the edge on the outer circumferential side of the IDTA 103a in the L0 layer faces the edge on the inner circumferential side of the RMA 114 in the L1 layer. Even in this case, however, it is possible to record the OPC pattern into the IDTA 113a in the L1 layer which faces the L0 layer in which the data is not recorded. In the same manner, it is possible to record the OPC pattern into the IDTA 103a in the L0 layer which faces the L1 layer in which the data is not recorded.

Incidentally, in FIG. 7, the clearance is not considered; however, even if the clearance is considered, the construction will be the same. Then, if the clearance is considered, it is possible to record the OPC pattern into the IDTA 113a in the L1 layer which faces the L0 layer in which the data is not recorded, even if there is an eccentricity, or regardless of the size of the spot of the laser light LB on the L0 layer. In the same manner, it is possible to record the OPC pattern into the IDTA 103a in the L0 layer which faces the L1 layer in which the data is not recorded.

Now, the specific address value and the radial position of each area on the optical disc 100 will be explained with reference to FIG. 8 and FIG. 9. FIG. 8 is a data structural diagram showing the specific address value and the radial position of each area, disposed on the most inner circumferential side. FIG. 9 is a data structural diagram showing the specific address value and the radial position of each area, disposed on the most outer circumferential side, in a 12 cm-diameter disc. Incidentally, in FIG. 8 and FIG. 9, the explanation is made by using a DVD-R, which is one specific example of the optical disc 100. Therefore, the explanation is made by using "40 μm" as a specific value of the relative tolerance.

As shown in FIG. 8, the address of the edge on the inner circumferential side of the IDTA 113a in the L1 layer is "0021C6h" and the radial position thereof is "22 mm+40 μm=22.04 mm". This "22 mm" is a minimum radial position where the data can be stably recorded, and the edge on the inner circumferential side of the IDTA 113a in the L1 layer is disposed at a position obtained by shifting to the outer circumferential side by "40 μm" (i.e. a length corresponding to the relative tolerance) from the minimum radial position. Moreover, the address of an area portion in the L0 layer corresponding to the edge on the inner circumferential side of the IDTA 113a in the L1 layer is "FFE077h".

The edge on the outer circumferential side of the IDTA 113a in the L1 layer and the edge on the inner circumferential side of the IDTA 103a in the L0 layer are away from each other at least by "84+40=124 μm" in the radial direction. Namely, here, "84 μm" is used as a specific value of the clearance.

The address of the edge of on the outer circumferential side of the IDTA 103a in the L0 layer is "FFDE33h", and the address of the corresponding area portion in the L1 layer is "00240Ah". Moreover, the radial position of the edge on the outer circumferential side of the IDTA 103a in the L0 layer (or the corresponding area portion of the L1 layer) is 22.320 mm.

The edge on the outer circumferential side of the IDTA 103a in the L0 layer and the edge on the inner circumferential side of the RMA 114 in the L1 layer are away from each other at least by "65+40=105 μm" in the radial direction. Moreover, the edge on the outer circumferential side of the RMA 114 in the L1 layer and the edge on the outer circumferential side of the RMA 104 in the L0 layer are away from each other at least by "65+40=105 μm" in the radial direction. Namely, here, "65 μm" is used as a specific value of the clearance. Moreover, the address of the edge on the inner circumferential side of the RMA 104 in the L0 layer is "FFDE31h", and the address of the edge on the outer circumferential side of the RMA 104 in the L0 layer is "FFDBBDh". Moreover, the address of an area portion in the L1 layer corresponding to the edge on the outer circumferential side of the RMA 104 in the L0 layer is "002680h". Moreover, the address of the edge on the inner circumferential side of the RMA 114 in the L1 layer is "0024E6h", and the radial position thereof is "22.425 mm". The address of the edge on the outer circumferential side of the RMA 114 in the L1 layer is "0025A2h", and the radial position thereof is "22.515 mm".

If the NBCA 106 is provided, the radial position of the edge on the inner circumferential side of the NBCA 106 is "22.710 mm", and the radial position of the edge on the outer circumferential side of the NBCA 106 is "23.510 mm". Moreover, if the NBCA 106 is provided, the radial position of the edge on the inner circumferential side of the lead-in area 102 in the L0 layer and the radial position of the edge on inner circumferential side of the lead-out area 118 in the L1 layer are both "23.696 mm".

If the NBCA 106 is not provided, the radial position of the edge on the inner circumferential side of the lead-in area 102 in the L0 layer and the radial position of the edge on inner circumferential side of the lead-out area 118 in the L1 layer are both "22.620 mm". In this case, the address of the edge on the inner circumferential side of the lead-in area 102 in the L0 layer is "FFDBBBh", and the address of the edge on inner circumferential side of the lead-out area 118 in the L1 layer is "002682h".

As described above, on the inner circumferential side of the optical disc 100, a space area having a length in the radial direction corresponding to the relative tolerance is ensured, so as not to overlap the IDTA 113a in the L1 layer and the IDTA 103a in the L0 layer and not to overlap the IDTA 103a in the L0 layer and the RMA 114 in the L1 layer. Moreover, the edge on the outer circumferential side of the RMA 104 and the edge on the outer circumferential side of the RMA 114 are away from each other by a length corresponding to the relative tolerance in the radial direction such that the data can be recorded into the RMA 104 in the L0 layer and the RMA 114 in the L1 layer while the above-mentioned recording order is maintained.

Then, as shown in FIG. 9, the address of the edge on the inner circumferential side of the ODTA 113b in the L1 layer is "023574h", and the address of the corresponding area portion of the L0 layer is "FDCCC9h". Moreover, the radial position of the edge on the inner circumferential side of the ODTA 113b in the L1 layer (or the corresponding area portion of the L0 layer) is "58.3 mm".

The edge on the outer circumferential side of the ODTA 113b in the L1 layer and the edge on the inner circumferential side of the ODTA 103b in the L0 layer are set to be away from each other at least by "84+40=124 µm" in the radial direction. Namely, here, "84 µm" is used as a specific value of the clearance. The address of the edge on the outer circumferential side of the ODTA 103b in the L0 layer is "FDC887h", and the address of the corresponding area portion of the L1 layer is "0239B6h". Moreover, the radial position of the edge on the outer circumferential side of the ODTA 103b in the L0 layer (or the corresponding area portion of the L1 layer) is "58.5 mm". Incidentally, the structure of each area, disposed on the most outer circumferential side, in an 8 cm-diameter disc is the same as that of the 12 cm-diameter disc shown in FIG. 9. With respect to the specific address value and the radial position of each area, disposed on the most outer circumferential side, in the case of the 8 cm-diameter disc, the address of the edge on the inner circumferential side of the ODTA 113b in the L1 layer is "00D4D7h", and the address of the corresponding area portion in the L0 layer is "FF2D66h". Moreover, the radial position of the edge on the inner circumferential side of the ODTA 113b in the L1 layer (or the corresponding area portion of the L0 layer) is "38.3 mm".

The edge on the outer circumferential side of the ODTA 113b in the L1 layer and the edge on the inner circumferential side of the ODTA 103b in the L0 layer are set to be away from each other at least by "84+40=124 µm" in the radial direction. Namely, here, "84 µm" is used as a specific value of the clearance. The address of the edge on the outer circumferential side of the ODTA 103b in the L0 layer is "FF2A99h", and the address of the corresponding area portion of the L1 layer is "00D7A4h". Moreover, the radial position of the edge on the outer circumferential side of the ODTA 103b in the L0 layer (or the corresponding area portion of the L1 layer) is "38.5 mm".

As described above, on the outer circumferential side of the optical disc 100, a space area having a length in the radial direction corresponding to the relative tolerance is ensured, so as not to overlap the ODTA 113b in the L1 layer and the ODTA 103b in the L0 layer.

The specific area structure explained above is realized as it is, if the position shift in the L0 layer and the position shift in the L1 layer are both "0". Alternatively, if the position shift in the L0 layer and the position shift in the L1 layer are not "0", but if the relative position shift between the L0 layer and the L1 layer is "0" as a result (i.e. the position shift in the L0 layer is equal to the position shift in the L1 layer), although the radial position differs from the position to be originally defined, the relative position relationship among the areas in the L0 layer and the L1 layer is realized as shown in FIG. 8 and FIG. 9. Alternatively, if the relative position shift between the L0 layer and the L1 layer is not "0", the relative position relationship among the areas in the L0 layer and the L1 layer, shown in FIG. 8 and FIG. 9, is changed. In other words, FIG. 8 and FIG. 9 show the arrangement of each area in design, and the radial position of each area on the actual optical disc 100 changes, depending on the extent of the position shift. However, even if the radial position of each area changes, depending on the extent of the position shift, the relationship explained in FIG. 7 is maintained.

As explained above, according to the optical disc 100 in the embodiment, a space area having a length in the radial direction corresponding to the relative tolerance (or the sum of the relative tolerance and the clearance) is ensured between the recording area in the L0 layer and the recording area in the L1 layer, whose radial positions are next to or close to each other and in which overlapping each other as viewed from the irradiation side of the laser light LB causes a disadvantage. In other words, the recording areas are away from each other by the length corresponding to the relative tolerance in the radial direction. Therefore, even if there is a position shift of the address (moreover, even if there is an eccentricity), it is possible to record the data into the recording area in the L1 layer which faces the recording area in the L0 layer in which the data is not recorded. In other words, it is possible to record the data into the L1 layer by irradiating the L1 layer with the laser light LB through the L0 layer in which the data is unrecorded. In the same manner, it is possible to record the data into the recording area in the L0 layer which faces the recording area in the L1 layer in which the data is not recorded. By this, it is possible to preferably record the data into the recording area in which the data needs to be recorded in such a condition that the data is not recorded in the recording area of the facing recording layer, such as the IDTA 103a and 113a and the ODTA 113b and 113b.

Moreover, as in a relationship between the edges on the outer circumferential side of the RMA 114 and the RMA 104, it is also possible to preferably record the data into the recording area in the L1 layer in which the data needs to be recorded in such a condition that the data is recorded in the facing L0 layer, even if there is a position shift of the address (moreover, even if there is an eccentricity).

Incidentally, in the above-mentioned embodiment, an explanation was given to the construction that a space area having a length in the radial direction corresponding to the relative tolerance is provided between an area in the L0 layer and an area in the L1 layer. However, the same construction can be also applied to a relationship between an area in the L0 layer and the NBCA 106 in the L0 layer. In other words, a space area having a length in the radial direction corresponding to the relative tolerance may be provided between each area in the L0 layer (specifically an area next to the NBCA 106) and the NBCA 106. The relative tolerance in this case, however, corresponds to the sum of the position tolerance of the L0 layer and a position tolerance caused by a cutting apparatus in forming the NBCA 106. This is because the NBCA 106 is formed by its own cutting apparatus, differently from the case of the other areas, which causes a position shift, separately from the position shift of the L0 layer. As described above, by providing a space area having a length in the radial direction corresponding to the relative tolerance between each area in the L0 layer and the NBCA 106, it is possible to prevent a disadvantage that each area in the L0 layer overlaps with the NBCA 106. As a result, it is possible to preferably record the data into each area in the L0 layer, and at the same time, it is possible to preferably read the various identification data recorded in the NBCA 106.

(3) Other Specific Area Structures

Next, with reference to FIG. 10 and FIG. 11, other specific area structures will be discussed. FIG. 10 and FIG. 11 are both data structural diagrams conceptually showing another specific area structure on the optical disc.

Incidentally, in FIG. 10 and FIG. 11, for simplification of explanation, two recording areas in the L0 layer are referred to an area L0-A and an area L0-B, and two recording areas in the L1 layer are referred to an area L1-A and an area L1-B, instead of using the name of the above-mentioned specific areas.

As shown in FIG. 10(a), on an optical disc 100a, an area portion in the L1 layer corresponding to the edge on the outer circumferential side of the area L0-A in the L0 layer and the edge on the inner circumferential side of the area L1-B in the L1 layer are away from each other by a length corresponding to the relative tolerance in the radial direction. Moreover, an area portion in the L1 layer corresponding to the edge on the inner circumferential side of the area L0-B in the L0 layer next to the area L0-A in the L0 layer and the edge on the outer circumferential side of the area L1-A in the L1 layer are away from each other by a length corresponding to the relative tolerance in the radial direction. At this time, it is assumed that the address of a border of the area L0-A and the area L0-B in the L0 layer is an address "X", and that the address "X" is defined at a radial position "r" in design. Moreover, it is assumed that the address of an area portion in the L1 layer corresponding to an area portion represented by the address "X" is "Y". If the position shift of the L0 layer and the position shift of the L1 layer are both "0" (i.e. a relative position shift is "0"), the area structure of the actual optical disc 100a is as shown in FIG. 10(a).

On the other hand, on the optical disc 100a, the case where the position shift of the L0 layer is a negative maximum value "−a" and the position shift of the L1 layer is a positive maximum value "+b" will be explained. Namely, an explanation will be given to the case where the radial position where the address is actually defined is shifted by "a" to the inner circumferential side from the radial position where the address is originally to be defined in the L0 layer and the radial position where the address is actually defined is shifted by "b" to the outer circumferential side from the radial position where the address is originally to be defined in the L1 layer. In this case, as shown in FIG. 10(b), the address "X" in the L0 layer which is originally to be defined at the radial position "r" is defined at a radial position "r−a". Moreover, the address "Y" in the L1 layer which is originally to be defined at the radial position "r" is defined at a radial position "r+b". Along with this, the radial position of each area in the L0 layer and the L1 layer differs from the radial position defined in design, shown in FIG. 10(a). Thus, for example, the edge on the outer circumferential side of the L1-A in the L1 layer faces the edge on the inner circumferential side of the L0-B in the L0 layer. Even in this case, however, it is possible to record the data into the L1-A in the L1 layer, without an influence of a change in the condition of whether the data is already recorded or not recorded in the L0-B in the L0 layer. In other words, it is possible to record the data into the area L1-A in the L1 layer, without the area L0-B in the L0 layer irradiated with the laser light LB. In the same manner, it is possible to record the data into the L1-B in the L1 layer, without an influence of a change in the condition of whether the data is already recorded or not recorded in the L0-A in the L0 layer. In other words, it is possible to record the data into the area L1-B in the L1 layer, without the area L0-A in the L0 layer irradiated with the laser light LB.

Moreover, even if the data needs to be recorded into the area L1-A and the area L1-B by irradiating them with the laser light LB through the recording area in the L0 layer in which the data is recorded, this need can be satisfied, preferably, according to the optical disc 100a. In other words, even if the area L1-A and the area L1-B are not the IDTA 103 and 113a and the ODTA 103b and 113b (e.g. even if the area L1-A and the area L1-B are partial recording areas in the data areas 105 and 115), it is possible to preferably record the data into the area L1-A and the area L1-B. In other words, if the data is already recorded in the area L0-A in the L0 layer, it is possible to record the data into the area L1-A in the L1 layer by irradiating the laser light LB through the recording area in the L0 layer in which the data is recorded. As described above, the optical disc 100 or the like in the embodiment, provided with a space area corresponding to the "relative tolerance", has such a great advantage that the data can be preferably recorded thereon, regardless of the presence or absence of a shift in the radial position where the address is defined or the regardless of the extent of the shift, in both the case where the data is recorded into the recording area in the L1 layer by irradiating the laser light LB through the recording area in the L0 layer in which the data is already recorded and the case where the data is recorded into the recording area in the L1 layer by irradiating the laser light LB through the recording area in the L0 layer in which the data is not recorded. The same can be said in the above-mentioned explanation with reference to FIG. 3 to FIG. 9 and in an explanation below with reference to FIG. 10 to FIG. 14.

On the other hand, the case where the position shift of the L0 layer is a positive maximum value "+a" and the position shift of the L1 layer is a negative maximum value "−b" will be explained. Namely, an explanation will be given to the case where the radial position where the address is actually defined is shifted by "a" to the outer circumferential side from the radial position where the address is originally to be defined in the L0 layer and the radial position where the address is actually defined is shifted by "b" to the inner circumferential side from the radial position where the address is originally to be defined in the L1 layer. In this case, as shown in FIG. 10(c), the address "X" in the L0 layer which is originally to be defined at the radial position "r" is defined at a radial position "r+a". Moreover, the address "Y" in the L1 layer which is originally to be defined at the radial position "r" is defined at a radial position "r−b". Along with this, the radial position of each area in the L0 layer and the L1 layer differs from the radial position defined in design, shown in FIG. 10(a). Thus, for example, the edge on the outer circumferential side of the area L0-A in the L0 layer faces the edge on the inner circumferential side of the L1-B in the L1 layer. Even in this case, however, it is possible to record the data into the L1-B in the L1 layer, without an influence of a change in the condition of whether the data is already recorded or not recorded in the L0-A in the L0 layer. In other words, it is possible to record the data into the area L1-B in the L1 layer, without the area L0-A in the L0 layer irradiated with the laser light LB. In the same manner, it is possible to record the data into the L1-A in the L1 layer, without an influence of a change in the condition of whether the data is already recorded or not recorded in the L0-B in the L0 layer. In other words, it is possible to record the data into the area L1-A in the L1 layer, without the area L0-B in the L0 layer irradiated with the laser light LB.

As shown in FIG. 11(a), on an optical disc 100b, an area portion in the L1 layer corresponding to the edge on the outer circumferential side of the area L0-A in the L0 layer and the edge on the inner circumferential side of the area L1-B in the L1 layer are away from each other by a length corresponding to the relative tolerance in the radial direction. Moreover, an area portion in the L1 layer corresponding to the edge on the inner circumferential side of the area L0-B in the L0 layer and the edge on the outer circumferential side of the area L1-A in the L1 layer are away from each other by a length corresponding to the relative tolerance in the radial direction. Moreover, the edge on the inner circumferential side of the area L0-A in the L0 layer corresponds to (i.e. exists at the same radial position in design as that of the edge on the inner circumferential side of the area L1-A in the L1 layer. In the same manner, the edge on the inner circumferential side of the area L0-B in the L0 layer corresponds to (i.e. exists at the same radial position in design as that of) the edge on the inner circumferential side of the area L1-B in the L1 layer. At this time, it is assumed that the address of the edge on the outer circumferential side of the area L0-A in the L0 layer is an address "X", and that the address "X" is defined at a radial position "r" in design. Moreover, it is assumed that the address of an area portion of the L1 layer corresponding to an area portion represented by the address "X" (i.e. the edge on the outer circumferential side of the area L1-A in the L1 layer) is "Y". If the position shift of the L0 layer and the position shift of the L1 layer are both "0" (i.e. a difference in the relative position is "0"), the area structure of the actual optical disc 100b is as shown in FIG. 11(a).

On the other hand, on the optical disc 100b, the case where the position shift of the L0 layer is a negative maximum value "−a" and the position shift of the L1 layer is a positive maximum value "+b" will be explained. Namely, an explanation will be given to the case where the radial position where the address is actually defined is shifted by "a" to the inner circumferential side from the radial position where the address is originally to be defined in the L0 layer and the radial position where the address is actually defined is shifted by "b" to the outer circumferential side from the radial position where the address is originally to be defined in the L1 layer. In this case, as shown in FIG. 11(b), the address "X" in the L0 layer which is originally to be defined at the radial position "r" is defined at a radial position "r−a". Moreover, the address "Y" in the L1 layer which is originally to be defined at the radial position "r" is defined at a radial position "r+b". Along with this, the radial position of each area in the L0 layer and the L1 layer differs from the radial position defined in design, shown in FIG. 11(a). Thus, for example, the edge on the outer circumferential side of the L1-A in the L1 layer faces the edge on the inner circumferential side of the L0-B in the L0 layer. Even in this case, however, it is possible to record the data into the L1-A in the L1 layer, without an influence of a change in the condition of whether the data is already recorded or not recorded in the L0-B in the L0 layer. In other words, it is possible to record the data into the area L1-A in the L1 layer, without the area L0-B in the L0 layer irradiated with the laser light LB. In the same manner, it is possible to record the data into the L1-B in the L1 layer, without an influence of a change in the condition of whether the data is already recorded or not recorded in the L0-A in the L0 layer. In other words, it is possible to record the data into the area L1-B in the L1 layer, without the area L0-A in the L0 layer irradiated with the laser light LB.

On the other hand, the case where the position shift of the L0 layer is a positive maximum value "+a" and the position shift of the L1 layer is a negative maximum value "−b" will be explained. Namely, an explanation will be given to the case where the radial position where the address is actually defined is shifted by "a" to the outer circumferential side from the radial position where the address is originally to be defined in the L0 layer and the radial position where the address is actually defined is shifted by "b" to the inner circumferential side from the radial position where the address is originally to be defined in the L1 layer. In this case, as shown in FIG. 11(c), the address "X" in the L0 layer which is originally to be defined at the radial position "r" is defined at a radial position "r+a". Moreover, the address "Y" in the L1 layer which is originally to be defined at the radial position "r" is defined at a radial position "r−b". Along with this, the radial position of each area in the L0 layer and the L1 layer differs from the radial position defined in design, shown in FIG. 11(a). Thus, for example, the edge on the outer circumferential side of the area L0-A in the L0 layer faces the edge on the inner circumferential side of the L1-B in the L1 layer. Even in this case, however, it is possible to record the data into the L1-B in the L1 layer, without an influence of a change in the condition of whether the data is already recorded or not recorded in the L0-A in the L0 layer. In other words, it is possible to record the data into the area L1-B in the L1 layer, without the area L0-A in the L0 layer irradiated with the laser light LB. In the same manner, it is possible to record the data into the L1-A in the L1 layer, without an influence of a change in the condition of whether the data is already recorded or not recorded in the L0-B in the L0 layer. In other words, it is possible to record the data into the area L1-A in the L1 layer, without the area L0-B in the L0 layer irradiated with the laser light LB.

(Embodiment of Recording Apparatus)

Next, with reference to FIG. 12 to FIG. 15, the structure and operation of a recording/reproducing apparatus 200, as being an embodiment according to the recording apparatus of the present invention, will be explained.

(1) Basic Structure

At first, with reference to FIG. 12, the basic structure of the recording/reproducing apparatus 200 will be discussed. FIG. 12 is a block diagram conceptually showing the basic structure of the recording/reproducing apparatus 200 in the embodiment. Incidentally, the recording/reproducing apparatus 200 has a function of recording the data onto the optical disc 100 and a function of reproducing the data recorded on the optical disc 100.

As shown in FIG. 12, the recording/reproducing apparatus 200 is provided with: a disc drive 300 into which the optical disc 100 is actually loaded and in which the data is recorded and reproduced; and a host computer 400, such as a personal computer, for controlling the recording and reproduction of the data with respect to the disc drive 300.

The disc drive 300 is provided with: the optical disc 100; a spindle motor 351; an optical pickup 352; a signal recording/reproducing device 353; a CPU (drive control device) 354; a memory 355; a data input/output control device 306; and a bus 357. Moreover, the host computer 400 is provided with: a CPU 359; a memory 360; an operation/display control device 307; an operation button 310; a display panel 311; and a data input/output control device 308.

The spindle motor 351 is intended to rotate and stop the optical disc 100, and operates upon accessing the optical disc. More specifically, the spindle motor 351 is constructed to rotate and stop the optical disc 100 at a predetermined speed, under spindle servo from a not-illustrated servo unit or the like.

The optical pickup 352 constitutes one specific example of the "recording device" of the present invention and is provided with a semiconductor laser device, a lens, and the like, to perform the recording/reproduction with respect to the optical disc 100. More specifically, the optical pickup 352 irradiates the optical disc 100 with a light beam, such as a laser beam, as reading light with a first power upon reproduction, and as writing light with a second power upon recording, with it modulated.

The signal recording/reproducing device 353 controls the spindle motor 351 and the optical pickup 352, to thereby perform the recording/reproduction with respect to the optical disc 100. More specifically, the signal recording/reproducing device 353 is provided with: a laser diode (LD) driver; a head amplifier; and the like, for example. The laser diode driver (LD driver) drives a not-illustrated semiconductor laser located in the optical pickup 352. The head amplifier amplifies the output signal of the optical pickup 352, i.e. the reflective light of a light beam, and outputs the amplified signal. More specifically, the signal recording/reproducing device 353 drives the not-illustrated semiconductor laser device located in the optical pickup 352, in order to determine an optimum laser power by the recording and reproduction processes for the OPC pattern, together with a not-illustrated timing generator or the like, under the CPU 354, upon the OPC process.

The memory 355 is used in the whole data processing and the OPC process or the like on the disc drive 300, including a buffer area for the record/reproduction data, an area used as an intermediate buffer when data is converted into the data that can be used on the signal recording/reproducing device 353, and the like. Moreover, the memory 355 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 354 is connected to the signal recording/reproducing device 353 and the memory 355 through the bus 357, and controls the entire disc drive 300 by giving an instruction to various controlling devices. Normally, software or firmware for operating the CPU 354 is stored in the memory 355.

The data input/output control device 306 controls the input/output of the data from the exterior with respect to the disc drive 300, to thereby perform storage to and export from the data buffer on the memory 355. A drive control command issued from the external host computer 400 connected to the disc drive 300 through an interface, such as a SCSI and an ATAPI, is transmitted to the CPU 354 through the data input/output control device 306. Moreover, the record/reproduction data is also transmitted to and received from the host computer 400 through the data input/output control device 306, in the same manner.

The operation/display control device 307 receives an operation instruction and performs display with respect to the host computer 400, and transmits an instruction by the operation button 310, such as an instruction to record or reproduce, to the CPU 359. The CPU 359 may transmit a control command to the disc drive 300, through the data input/output control device 308, on the basis of instruction information from the operation/display control device 307, to thereby control the entire disc drive 300. In the same manner, the CPU 359 can transmit a command for requesting the disc drive 300 to transmit an operational state to the host, with respect to the disc drive 300. By this, the operational state of the disc drive 300, such as during recording and during reproduction, can be recognized, so that the CPU 359 can output the operational state of the disc drive 300 to the display panel 310, such as a fluorescent tube and an LCD, through the operation/display control device 307.

The memory 360 is an inner storage apparatus used by the host computer 400, and is provided with: a ROM area into which a firmware program, such as a BIOS (Basic Input/Output System), is stored; a RAM area into which a parameter required for the operation of an operating system and an application program or the like is stored; and the like. Moreover, the memory 360 may be connected to a not-illustrated external storage apparatus, such as a hard disk, through the data input/output control device 308.

One specific example used by combining the disc drive 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 360, on the CPU 359. Moreover, in another specific example, the disc drive 300 is a disc drive (hereinafter referred to as a "drive", as occasion demands), and the host computer 400 is a personal computer and a work station. The host computer, such as the personal computer, and the drive are connected through the data input/output control devices 306 and 308, such as the SCSI and the ATAPI, and application, such as writing software, installed in the host computer 400 controls the disc drive 300.

(2) Operation Principle

Next, with reference to FIG. 13 to FIG. 15, the recording operation of the recording/reproducing apparatus 200 in the embodiment will be discussed. Here, FIG. 13 is a flowchart conceptually showing a flow of the recording operation of the recording/reproducing apparatus 200 in the embodiment. Each of FIG. 14 and FIG. 15 are data structural diagrams conceptually showing an aspect of recording the data on an optical disc 101.

As shown in FIG. 13, at first, under the control of the CPU 354 or 359, which constitutes one specific example of the "controlling device" of the present invention, the relative tolerance of the optical disc 101 is obtained (step S101). This relative tolerance may be recorded in advance on the optical disc 101, as data which indicates the relative tolerance. Alternatively, it may be stored in the memory 355 or 360 of the recording/reproducing apparatus 200, for example. Moreover, instead of the relative tolerance, the position tolerance of each of the L0 layer and the L1 layer may be recorded on the optical disc 101 or stored in the memory 355 or 360. Alternatively, the value of the actual relative position shift of the optical disc 101 which is a target of the recording operation or the value of the position shift of each layer may be recorded or stored, and the value of the actual relative position shift may be regarded and treated as the position tolerance.

Then, the data is recorded into the L0 layer (step S102). Then, under the control of the CPU 354 or 359, an interval in the L1 layer in which the data is not recorded (i.e. the above-mentioned space area) is set, in accordance with the aspect of recording the data in the L0 layer (step S103). This setting is performed on the basis of the relative tolerance obtained in the step S101. Then, the data is recorded into the L1 layer except the interval (step S104).

The actual aspect of recording the data will be discussed below. At first, an aspect of recording the data into the IDTA 103a and 113a will be explained. In a dual-layer DVD-R, areas allocated as the IDTA are area which is located from r=22.04 mm to r=22.32 mm, in both the L0 layer and the L1 layer, in the above-mentioned FIG. 8. In the area, as shown in FIG. 14(a), a recording power is calibrated by recording the OPC pattern into the IDTA 103a from the outer circumferential side of the IDTA 103a to the inner circumferential side of the IDTA 113a. In other words, the OPC pattern is recorded into the IDTA 103a in the order of X1, X2, ..., Xm. And a recording power is calibrated by recording the OPC pattern into the IDTA 113a from the inner circumferential side of the IDTA 113a to the outer circumferential side of the IDTA 113a. In other words, the OPC pattern is recorded into the IDTA 113a in the order of Y1, Y2, ..., Yn. Here, the capacity of the area in one recording layer allocated as the IDTA is regarded as A, and X1, X2, ..., Xm and Y1, Y2, ..., Yn are regarded as respective capacities used for the recording power calibration. Moreover, in the IDTA, the recording power is calibrated to satisfy an equation (1), wherein $\Delta$ is the capacity of an area having a length corresponding to the relative tolerance in the radial direction.

$$A-(X1+X2+\ldots+Xm)-(Y1+Y2+\ldots+Yn) \geq \Delta \quad (1)$$

By this, the capacity of an area corresponding to the area which is located from the outer circumferential edge of the IDTA 113a in the L1 layer to the inner circumferential edge of the IDTA 103a in the L0 layer has at least the capacity $\Delta$ of an area having a length corresponding to the relative tolerance in the radial direction. Namely, with respect to a difference in the radius between the outer circumferential edge of the IDTA 113a in the L1 layer and the inner circumferential edge of the IDTA 103a in the L0 layer, the length corresponding to the relative tolerance is always ensured in the radial direction.

In particular, a case of equality in the equation (1) will be discussed. In this case, as shown in FIG. 14(b), it is assumed that the OPC pattern is recorded from the outer circumferential side of the IDTA 103a to the position whose address is "X". If the address of an area portion in the L1 layer corresponding to the edge on the inner circumferential side of the IDTA 103a in the L0 layer is "Y", it is possible to record the OPC pattern from the inner circumferential edge of the IDTA 113a in the L1 layer to a position obtained by shifting by a length corresponding to the relative tolerance to the inner circumferential side from an area portion represented by the address "Y" (specifically, an area portion represented by an address "Y−$\Delta$Y", wherein $\Delta$Y is the variation of the address corresponding to the capacity $\Delta$). Namely, the area portion represented by the address "Y−$\Delta$Y" corresponds to the edge on the outer circumferential side of the IDTA 113a. Incidentally, it is assumed that the address "X" and the address "Y" are addresses defined in the area portions with a radial position of "r", originally; namely, in design.

If the position shift in the L0 layer and the position shift in the L1 layer are both "0", the OPC pattern is recorded in a relationship of the radial position, as shown in hatching portions in FIG. 14(b). In other words, the OPC pattern can be recorded into an area portion in the L0 layer which faces the L1 layer in which the data is not recorded. Moreover, the OPC pattern is recorded into the L1 layer by irradiating the L1 layer with the laser light LB through the L0 layer in which the data is not recorded. Therefore, it is possible to preferably calibrate the recording power of the laser light LB in each recording layer.

Now, the case where the position shift of the L0 layer is a negative maximum value "−a" and the position shift of the L1 layer is a positive maximum value "+b" will be explained. Namely, an explanation will be given to the case where the radial position where the address is actually defined is shifted by "a" to the inner circumferential side from the radial position where the address is originally to be defined in the L0 layer and the radial position where the address is actually defined is shifted by "b" to the outer circumferential side from the radial position where the address is originally to be defined in the L1 layer. In other words, the situation that the edge on the outer circumferential side of the IDTA 113a in the L1 layer is closest to the edge on the inner circumferential side of the IDTA 103a in the L0 layer. In this case, as shown in FIG. 14(c), the address "X" in the L0 layer which is originally to be defined at the radial position "r" is defined at a radial position "r−a". Moreover, the address "Y" in the L1 layer which is originally to be defined at the radial position "r" is defined at a radial position "r+b". Along with this, the radial position of each area in the L0 layer and the L1 layer differs from the radial position defined in design, shown in FIG. 14(b). Thus, for example, the edge on the outer circumferential side of the IDTA 113a in the L1 layer faces the edge on the inner circumferential side of the IDTA 103a in the L0 layer. Even in this case, however, the OPC pattern can be recorded into an area portion in the L0 layer which faces the L1 layer in which the data is not recorded. Moreover, the OPC pattern is recorded into the L1 layer by irradiating the L1 layer with the laser light LB through the L0 layer in which the data is not recorded. Therefore, it is possible to preferably calibrate the recording power of the laser light LB in each recording layer.

This recording aspect is the same in the ODTA 103b and 113b.

Another recording aspect of the IDTA 103a and 113a will be discussed with reference to FIG. 14(b). At first, the OPC pattern is recorded into the IDTA 103a in the L0 layer in which the address of the edge on the inner circumferential side is "X". If the address of an area portion in the L1 layer corresponding to the edge on the inner circumferential side of the IDTA 103a in the L0 layer is "Y", the OPC pattern is recorded from a position obtained by shifting by a length corresponding to the relative tolerance to the inner circumferential side from an area portion represented by the address "Y" (specifically, an area portion represented by an address "Y−$\Delta$Y"), in the L1 layer. Namely, the area portion represented by the address "Y−$\Delta$Y" corresponds to the edge on the outer circumferential side of the IDTA 113a. Incidentally, it is assumed that the address "X" and the address "Y" are addresses defined in the area portions with a radial position of "r", originally; namely, in design.

If the position shift in the L0 layer and the position shift in the L1 layer are both "0", the OPC pattern is recorded in a relationship of the radial position, as shown in hatching portions in FIG. 14(b). In other words, the OPC pattern can be recorded into an area portion in the L0 layer which faces the L1 layer in which the data is not recorded. Moreover, the OPC pattern is recorded into the L1 layer by irradiating the L1 layer with the laser light LB through the L0 layer in which the data is not recorded. Therefore, it is possible to preferably calibrate the recording power of the laser light LB in each recording layer.

Now, the case where the position shift of the L0 layer is a negative maximum value "−a" and the position shift of the L1 layer is a positive maximum value "+b" will be explained.

Namely, an explanation will be given to the case where the radial position where the address is actually defined is shifted by "a" to the inner circumferential side from the radial position where the address is originally to be defined in the L0 layer and the radial position where the address is actually defined is shifted by "b" to the outer circumferential side from the radial position where the address is originally to be defined in the L1 layer. In other words, the situation that the edge on the outer circumferential side of the IDTA 113*a* in the L1 layer is closest to the edge on the inner circumferential side of the IDTA 103*a* in the L0 layer. In this case, as shown in FIG. 14(*c*), the address "X" of the L0 layer which is originally to be defined at the radial position "r" is defined at a radial position "r−a". Moreover, the address "Y" of the L1 layer which is originally to be defined at the radial position "r" is defined at a radial position "r+b". Along with this, the radial position of each area in the L0 layer and the L1 layer differs from the radial position defined in design, shown in FIG. 14(*b*). Thus, for example, the edge on the outer circumferential side of the IDTA 113*a* in the L1 layer faces the edge on the inner circumferential side of the IDTA 103*a* in the L0 layer. Even in this case, however, the OPC pattern can be recorded into an area portion of the L0 layer which faces the L1 layer in which the data is not recorded. Moreover, the OPC pattern is recorded into the L1 layer by irradiating the L1 layer with the laser light LB through the L0 layer in which the data is not recorded. Therefore, it is possible to preferably calibrate the recording power of the laser light LB in each recording layer.

Next, a recording aspect in the case where the data is recorded into the data areas 105 and 115 will be explained. As shown in FIG. 15(*a*), at first, the data is recoded into the data area 105 in the L0 layer in which the address of the edge on the inner circumferential side is "X1" and the address of the edge on the outer circumferential side is "X2". Here, it is assumed that the address of an area portion in the L1 layer corresponding to the edge on the inner circumferential side of the data area 105 in the L0 layer is "Y1" and that the address of an area portion in the L1 layer corresponding to the edge on the outer circumferential side of the data area 105 in the L0 layer is "Y2". In this case, in the L1 layer, the data is recorded into the data area 115 from a position obtained by shifting by a length corresponding to the relative tolerance to the inner circumferential side from an area portion represented by the address "Y2" (specifically, an area portion represented by an address "Y2−ΔY") to a position obtained by shifting by a length corresponding to the relative tolerance to the outer circumferential side from an area portion represented by the address "Y1" (specifically, an area portion represented by an address "Y1+ΔY"). Incidentally, it is assumed that the address "X1" and the address "Y1" are addresses defined in the area portions with a radial position of "r", originally; namely, in design.

If the position shift in the L0 layer and the position shift in the L1 layer are both "0", the data is recorded in a relationship of the radial position, as shown in hatching portions in FIG. 15(*a*). In other words, the data is recorded into the L1 layer by irradiating the L1 layer with the laser light LB through the L0 layer in which the data is recorded. Thus, in recording the data into the one recording layer, a recording condition does not vary. Therefore, it is possible to preferably record the data in each recording layer.

On the other hand, the case where the position shift of the L0 layer is a negative maximum value "−a" and the position shift of the L1 layer is a positive maximum value "+b" will be explained. Namely, an explanation will be given to the case where the radial position where the address is actually defined is shifted by "a" to the inner circumferential side from the radial position where the address is originally to be defined in the L0 layer and the radial position where the address is actually defined is shifted by "b" to the outer circumferential side from the radial position where the address is originally to be defined in the L1 layer. In this case, as shown in FIG. 15(*b*), the address "X1" in the L0 layer which is originally to be defined at the radial position "r" is defined at a radial position "r−a". Moreover, the address "Y1" in the L1 layer which is originally to be defined at the radial position "r" is defined at a radial position "r+b". Along with this, the radial position of each area in the L0 layer and the L1 layer differs from the radial position defined in design, shown in FIG. 15(*a*). Thus, for example, the edge on the outer circumferential side of the data area 115 in the L1 layer faces the edge on the outer circumferential side of the data area 105 in the L0 layer. Even in this case, however, the data is recorded into the L1 layer by irradiating the L1 layer with the laser light LB through the L0 layer in which the data is recorded. Therefore, it is possible to preferably record the data in each recording layer.

On the other hand, the case where the position shift of the L0 layer is a positive maximum value "+a" and the position shift of the L1 layer is a negative maximum value "−b" will be explained. Namely, an explanation will be given to the case where the radial position where the address is actually defined is shifted by "a" to the outer circumferential side from the radial position where the address is originally to be defined in the L0 layer and the radial position where the address is actually defined is shifted by "b" to the inner circumferential side from the radial position where the address is originally to be defined in the L1 layer. In this case, as shown in FIG. 15(*c*), the address "X1" in the L0 layer which is originally to be defined at the radial position "r" is defined at a radial position "r+a". Moreover, the address "Y1" in the L1 layer which is originally to be defined at the radial position "r" is defined at a radial position "r−b". Along with this, the radial position of each area in the L0 layer and the L1 layer differs from the radial position defined in design, shown in FIG. 15(*a*). Thus, for example, the edge on the inner circumferential side of the data area 115 in the L1 layer faces the edge on the inner circumferential side of the data area 105 in the L0 layer. Even in this case, however, the data is recorded into the L1 layer by irradiating the L1 layer with the laser light LB through the L0 layer in which the data is recorded. Therefore, it is possible to preferably record the data in each recording layer.

Moreover, until the data is recorded into each of the L0 layer and the L1 layer, area setting may be performed in advance. In other words, the range or the like of each area (e.g. the IDTA 103*a* and 113*a*, the ODTA 103*b* and 113*b*, the RMA 104 and 114, the lead-in area 102, the lead-out area 118, the data areas 105 and 115, the middle areas 109 and 119, etc.) may be set before the data is recorded, such that the optical disc 101 has the same area structure as that of the optical disc 100 having the area structure shown in FIG. 1 to FIG. 11.

As explained above, according to the recording/reproducing apparatus 200, it is possible to record the data, in the same manner as the above-mentioned optical disc 100 in the embodiment, even onto the optical disc 101 which does not have the area structure in view of the relative tolerance as in the above-mentioned optical disc 100 in the embodiment. Therefore, it is possible to receive various benefits owned by the optical disc 100 in the embodiment.

In particular, if the actual position shift of the L0 layer and the actual position shift of the L1 layer are recorded on the optical disc 101, for example, the recording/reproducing apparatus 200 itself can perform the area setting, on the basis of the values of the actual position shift of the L0 layer and the actual position shift of the L1 layer. Thus, there is no need to perform the area setting by using an unnecessarily large relative tolerance. In other words, it is possible to perform the recording of the data or the like, or perform the area setting, not on the basis of the position tolerance which indicates the acceptable range of the position shift, but on the basis of the value of the actual position shift, which is equal to or less than the position tolerance, as a specific value of the relative tolerance. Thus, it is possible to increase the size of the data which can be recorded onto the optical disc 101. This is a great advantage if the manufacturer or the like of the optical disc can produce the high-quality optical disc 101.

On the other hand, since the recording/reproducing apparatus 200 itself can perform the area setting, on the basis of the value of the actual position shift recorded on the optical disc 101, the manufacturer or the like of the optical disc does not necessarily produce the optical disc 101 on which the actual position shift is raged within the position tolerance. Therefore, there is also an advantage that it is possible to increase a yield of the optical disc 101. Even in that case, the recording of the data or the area setting can be performed on the basis of the value of the actual position shift, so that there is no problem in the point that the data can be preferably recorded onto the optical disc 101 and that the preferable recording operation is realized.

Of course, it is obvious that the same benefits can be received even if the data is recorded onto the optical disc 100 which has the area structure, as explained in FIG. 1 to FIG. 11, in advance.

Moreover, in the above-mentioned embodiments, the optical disc 100 is explained as one example of the recording medium, and the recorder or player related to the optical disc 100 is explained as one example of the recording/reproducing apparatus. The present invention, however, is not limited to the optical disc and the recorder thereof, and can be applied to other various recording media, and the recorders or players thereof, which support high density recording or high transfer rate.

The present invention is not limited to the above-described embodiments, and various changes may be made, if desired, without departing from the essence or spirit of the invention which can be read from the claims and the entire specification. A recording medium, a recording apparatus and method, and a computer program for recording control, all of which involve such changes, are also intended to be within the technical scope of the present invention.

INDUSTRIAL APPLICABILITY

The recording medium, the recording apparatus and method, and the computer program according to the present invention can be applied to a high-density optical disc, such as a DVD, and further to a recording apparatus, such as a DVD recorder. Moreover, they can be applied to a recording apparatus or the like which is mounted on various computer equipment for consumer use or for commercial use, or which can be connected to various computer equipment.

The invention claimed is:

1. A recording medium comprising:
a first recording layer including a first data area into which data is recorded, a first calibration area which is placed on an inner side of the first data area and a third calibration area which is placed on an outer side of the first data area; and
a second recording layer including a second data area into which data is recorded, a second calibration area which is placed on an inner side of the second data area and a fourth calibration area which is placed on an outer side of the second data area, wherein
an edge on an other side, which is different from an one side, of the second calibration area is located at a position obtained by shifting to the one side at least by a tolerance length from an area portion in said second recording layer corresponding to an edge on the one side of the first calibration area, in a radial direction of the first recording layer or the second recording layer, in which the tolerance length indicates an acceptable range of a relative position shift between an address which is defined on the predetermined position in said first recording layer and an address which is related to the predetermined position in said second recording layer,
an edge on the other side of the fourth calibration area is located at a position obtained by shifting to the one side at least by the tolerance length from an area portion in said second recording layer corresponding to an edge on the one side of the third calibration area, in a radial direction of the first recording layer or the second recording layer.

2. The recording medium according to claim 1, wherein the edge on the other side of the second calibration area is located at a position obtained by shifting to the one side at least by a clearance length, in addition to the tolerance length, in which the clearance length indicates a sum of a maximum acceptable value of a spot radius of laser light on said first recording layer in the case where the laser light, which is for recording of record information onto said recording medium, is focused on said second recording layer and a maximum acceptable value of a relative eccentric shift of said first and second recording layers,
the edge on the other side of the fourth calibration area is located at a position obtained by shifting to the one side at least by the clearance length, in addition to the tolerance length.

3. The recording medium according to claim 1, wherein the tolerance length is a sum of an acceptable range of a position shift between a position where a predetermined address in said first recording layer is defined in design and a position of the predetermined address on an actually manufactured recording medium and an acceptable range of a position shift between a position in said second recording layer where a predetermined address is defined in design and a position of the predetermined address on an actually manufactured recording medium.

4. The recording medium according to claim 1, wherein record information is recorded into said first recording layer in one direction, and the record information is recorded into said second recording layer in another direction different from the one direction.

5. A recording apparatus comprising:
a recording device for recording record information onto a recording medium comprising a first recording layer and a second recording layer, the first recording layer including a first data area into which data is recorded, a first calibration area which is placed on an inner side of the first data area and a third calibration area which is placed on an outer side of the first data area, the second recording layer including a second data area into which data is recorded, a second calibration area which is placed on an inner side of the second data area and a fourth calibration area which is placed on an outer side of the second data area;
a first controlling device for controlling said recording device to record the record information, with at least an interval of a tolerance length in a radial direction of the first recording layer or the second recording layer between an area portion in said second recording layer corresponding to an edge on one side of the first calibration area and an edge on an other side, different from the one side, of the second calibration area which is an area portion in the second recording layer in which the record information is recorded, in which the tolerance length indicates an acceptable range of a relative position shift between said first recording layer and said second recording layer; and a second controlling device for controlling said recording device to record the record information, with at least an interval of the tolerance length in a radial direction of the first recording layer or the second recording layer between an area portion in said second recording layer corresponding to an edge on the one side of the third calibration area and an edge on the other side of the fourth calibration area which is an area portion in the second recording layer in which the record information is recorded.

6. The recording apparatus according to claim 5, wherein said first and second controlling devices control said recording device to record the record information, with an interval of a clearance length in addition to the tolerance length, in which the clearance length indicates a sum of a maximum acceptable value of a spot radius of laser light on said first recording layer in the case where the laser light, which is for recording of the record information onto said recording medium, is focused on said second recording layer and a maximum acceptable value of a relative eccentric shift of the first and second recording layers.

7. The recording apparatus according to claim 5, wherein the tolerance length is a sum of an acceptable range of a position shift between a position where a predetermined address in said first recording layer is defined in design and a position of the predetermined address on an actually manufactured recording medium and an acceptable range of a position shift between a position in said second recording layer where a predetermined address is defined in design and a position of the predetermined address on an actually manufactured recording medium.

8. The recording apparatus according to claim 5, wherein the record information is recorded into said first recording layer in one direction, and the record information is recorded into said second recording layer in another direction different from the one direction.

9. A recording method in a recording apparatus comprising a recording device for recording record information onto a recording medium comprising a first recording layer and a second recording layer, the first recording layer including a first data area into which data is recorded, a first calibration area which is placed on an inner side of the first data area and a third calibration area which is placed on an outer side of the first data area, the second recording layer including a second data area into which data is recorded, a second calibration area which is placed on an inner side of the second data area and a fourth calibration area which is placed on an outer side of the second data area, said recording method comprising:

a first controlling process of controlling said recording device to record the record information into said first recording layer and said second recording layer; and a second controlling process of controlling said recording device to record the record information, with at least an interval of a tolerance length in a radial direction of the first recording layer or the second recording layer between an area portion in said second recording layer corresponding to an edge on one side of the first calibration area and an edge on an other side, different from the one side, of the second calibration area which is an area portion in the second recording layer in which the record information is recorded, in which the tolerance length indicates an acceptable range of a relative position shift between said first recording layer and said second recording layer; and a third controlling process of controlling said recording device to record the record information, with at least an interval of the tolerance length in a radial direction of the first recording layer or the second recording layer between an area portion in said second recording layer corresponding to an edge on the one side of the third calibration area and an edge on the other side of the fourth calibration area which is an area portion in the second recording layer in which the record information is recorded.

10. A computer program product in a non-transitory computer-readable medium for embodying a program of instructions executable by a computer provided in a recording apparatus, to make the computer function as a first controlling device and a second controlling device, said recording apparatus comprising:

a recording device for recording record information onto a recording medium comprising a first recording layer and a second recording layer, the first recording layer including a first data area into which data is recorded, a first calibration area which is placed on an inner side of the first data area and a third calibration area which is placed on an outer side of the first data area, the second recording layer including a second data area into which data is recorded, a second calibration area which is placed on an inner side of the second data area and a fourth calibration area which is placed on an outer side of the second data area;

said first controlling device for controlling said recording device to record the record information, with at least an interval of a tolerance length in a radial direction of the first recording layer or the second recording layer between an area portion in said second recording layer corresponding to an edge on one side of the first calibration area and an edge on an other side, different from the one side, of the second calibration area which is an area portion in the second recording layer in which the record information is recorded, in which the tolerance length indicates an acceptable range of a relative position shift between said first recording layer and said second recording layer; and said second controlling device for controlling said recording device to record the record information, with at least an interval of the tolerance length in a radial direction of the first recording layer or the second recording layer between an area portion in said second recording layer corresponding to an edge on the one side of the third calibration area and an edge on the other side of the fourth calibration area which is an area portion in the second recording layer in which the record information is recorded.

* * * * *